US012717414B2

(12) United States Patent
Ham et al.

(10) Patent No.: US 12,717,414 B2
(45) Date of Patent: Aug. 25, 2026

(54) ELECTRONIC DEVICE AND METHOD FOR CONTROLLING PROVISION OF EVENT NOTIFICATION BASED ON USER INPUT

(71) Applicant: SAMSUNG ELECTRONICS CO., LTD., Suwon-si (KR)

(72) Inventors: Sunwoong Ham, Suwon-si (KR); Nahye Kim, Suwon-si (KR); Hyerim Kim, Suwon-si (KR); Jeesu Park, Suwon-si (KR); Wonkyu Sung, Suwon-si (KR); Daekwang Jung, Suwon-si (KR); Yunsu Cho, Suwon-si (KR); Doyoung Choi, Suwon-si (KR); Inje Hwang, Suwon-si (KR); Jihea Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/752,460

(22) Filed: Jun. 24, 2024

(65) Prior Publication Data

US 2025/0053240 A1 Feb. 13, 2025

Related U.S. Application Data

(63) Continuation of application No. PCT/KR2024/007502, filed on May 31, 2024.

(30) Foreign Application Priority Data

Aug. 11, 2023 (KR) ........................ 10-2023-0105904
Sep. 26, 2023 (KR) ........................ 10-2023-0129841

(51) Int. Cl.

| | |
|---|---|
| ***G06F 3/01*** | (2006.01) |
| ***G06F 3/041*** | (2006.01) |
| ***G08B 6/00*** | (2006.01) |

(52) U.S. Cl.
CPC ............ *G06F 3/016* (2013.01); *G06F 3/0414* (2013.01); *G08B 6/00* (2013.01)

(58) Field of Classification Search
CPC ........ G06F 3/016; G06F 3/041; G06F 3/0414; G08B 6/00
See application file for complete search history.

(56) References Cited

U.S. PATENT DOCUMENTS 9,696,807 B2 7/2017 Fleizach et al.
10,248,207 B2 4/2019 Dillon, Jr. et al.
(Continued)

FOREIGN PATENT DOCUMENTS

CN 111182099 A 5/2020
JP 3377904 B2 * 2/2003
(Continued)

OTHER PUBLICATIONS

Search Report dated Sep. 20, 2024 in International Patent Application No. PCT/KR2024/007502 and English-language translation.
(Continued)

*Primary Examiner* — Scott D Au
(74) *Attorney, Agent, or Firm* — Nixon & Vanderhye, P.C.

(57) ABSTRACT

An example electronic device includes a housing, a display, communication circuitry, a first actuator configured to provide vibration feedback in response to receiving an incoming call event through the communication circuitry, a sensor configured to receive a user touch input with respect to a side surface of the housing, a second actuator configured to provide vibration feedback in response to receiving the user touch input, and a processor. The processor is configured to control the first actuator to provide first vibration feedback in response to the incoming call event; receive a designated user touch input with respect to the side surface of the
(Continued)

housing while providing the first vibration feedback; and, in response to receiving the designated user touch input, control the first actuator to cease providing the first vibration feedback and control the second actuator to provide second vibration feedback.

17 Claims, 32 Drawing Sheets

(56) References Cited

U.S. PATENT DOCUMENTS

| | | | |
|---|---|---|---|
| 10,977,911 | B2 | 4/2021 | Moussette et al. |
| 11,198,154 | B2 | 12/2021 | Shim et al. |
| 11,216,177 | B2 | 1/2022 | Seomoon et al. |
| 11,262,845 | B2 | 3/2022 | Lee et al. |
| 11,449,216 | B2 | 9/2022 | Rho et al. |
| 11,526,210 | B2 | 12/2022 | Wang et al. |
| 2005/0208903 | A1 | 9/2005 | Sakamoto |
| 2010/0261509 | A1 | 10/2010 | Kovvali et al. |
| 2010/0267424 | A1 | 10/2010 | Kim et al. |
| 2015/0253852 | A1 | 9/2015 | Ota |
| 2019/0073077 | A1 | 3/2019 | Kim |
| 2019/0094973 | A1* | 3/2019 | Miller ..................... G06F 3/041 |
| 2019/0138200 | A1* | 5/2019 | Zhang ................... G06F 3/0346 |
| 2019/0339804 | A1 | 11/2019 | Gleeson |
| 2021/0192904 | A1* | 6/2021 | Moussette ............. G06F 3/0488 |
| 2023/0012223 | A1 | 1/2023 | Gleeson et al. |

FOREIGN PATENT DOCUMENTS

| | | | |
|---|---|---|---|
| KR | 10-2018-0097382 | 8/2018 | |
| KR | 20190027801 A | 3/2019 | |
| KR | 102412386 B1 * | 6/2022 | ........... G06F 3/0488 |
| KR | 10-2462204 | 11/2022 | |
| KR | 10-2023-0023486 | 2/2023 | |
| KR | 10-2519800 | 4/2023 | |
| WO | WO 2016135018 A1 * | 9/2016 | ........... G06F 3/0482 |

OTHER PUBLICATIONS

Written Opinion dated Sep. 20, 2024 in International Patent Application No. PCT/KR2024/007502.

Communication pursuant to Rule 164(1) EPC dated Jun. 8, 2026 in EP Application No. 24854270.6.

* cited by examiner

FIG. 9A
100
160
110
Incoming call
20
Christina
Mobile 0123 456 789
91
91
10
Send message
161

ELECTRONIC DEVICE AND METHOD FOR CONTROLLING PROVISION OF EVENT NOTIFICATION BASED ON USER INPUT

CROSS-REFERENCE TO RELATED APPLICATIONS

This application is a continuation application of International Application No. PCT/KR2024/007502 designating the United States, filed on May 31, 2024, in the Korean Intellectual Property Receiving Office and claiming priority to Korean Patent Application No. 10-2023-0105904, filed on Aug. 11, 2023 and Korean Patent Application No. 10-2023-0129841, filed on Sep. 26, 2023, in the Korean Intellectual Property Office, the disclosures of which are incorporated by reference herein in their entireties.

BACKGROUND

Field

The disclosure relates to an electronic device and a method for controlling provision of an event notification based on a user input.

Description of Related Art

As digital devices such as smart phones proliferate, the way users receive information or interact with information is changing in various ways. A notification provided by an electronic device provides an interface between the user and the device, and may continuously inform the user of various events, activities, and updates. This notification may be provided in several forms, such as a visual signal on a display screen, an auditory signal such as ringtone, tactile feedback such as vibration, or a combination thereof. The notification is an element in improving a user experience by providing various information in the right form at the right time.

The above-described information may be provided as related art for the purpose of helping to understand the present disclosure. No claim or determination is made as to whether any of the above-described information may be applied as a prior art related to the present disclosure.

SUMMARY

An electronic device according to an embodiment may include a housing, a display disposed in the housing, communication circuitry, a first actuator configured to provide vibration feedback in response to receiving an incoming call event through the communication circuitry, a sensor configured to receive a user touch input with respect to a side surface of the housing, a second actuator configured to provide vibration feedback in response to receiving the user touch input through the sensor, and at least one processor. The at least one processor may be configured to control the first actuator to provide first vibration feedback in response to the incoming call event. The at least one processor may be configured to receive, from the sensor, a designated user touch input with respect to the side surface of the housing while providing the first vibration feedback by the first actuator. The at least one processor may be configured to control the first actuator to cease providing the first vibration feedback and control the second actuator to provide second vibration feedback such that the second vibration feedback is provided through a finger corresponding to the designated user touch input with respect to the side surface of the housing, in response to receiving the designated user touch input.

An electronic device according to an embodiment may include a housing forming a side surface of the electronic device and including a first button and a second button located on the side surface, a first sensor configured to receive a touch input of a user to the first button, a second sensor configured to receive a touch input of the user to the second button, a display, a first actuator coupled to the first button and configured to provide vibration feedback in response to receiving a touch input to the first button, a second actuator coupled to the second button and configured to provide vibration feedback in response to receiving a touch input to the second button, and a processor. The processor may be configured to cause the display to provide a playback screen of a media. The processor may be configured to receive a first touch input to the first button by the first sensor while the playback screen of the media is provided. The processor may be configured to control the display to provide a pause screen of the media, in response to the first touch input. The processor may be configured to receive a second touch input to the first button from the first sensor while the pause screen is provided. The processor may be configured to control the display to display a volume indicator of the media as an overlay on the pause screen, in response to the second touch input. The processor may be configured to receive a third touch input to the first button from the first sensor while the volume indicator is displayed. The processor may be configured to adjust a volume of the media in units of a first value, and cause the first actuator to provide first vibration feedback through the first button in contact with a finger of the user, in response to the third touch input. The processor may be configured to receive a fourth touch input to the second button from the second sensor while the volume indicator is displayed. The processor may be configured to adjust the volume of the media in units of a second value greater than the first value, and control the second actuator to provide second vibration feedback through the second button in contact with a finger of the user, in response to the fourth touch input.

An electronic device according to an embodiment may include a housing, a button partially forming a side surface of the housing, a first actuator disposed to be spaced apart from the button, a second actuator in contact with the button, a sensor arranged with respect to the button, and a processor. The processor may be configured to detect an event. The processor may be configured to control the first actuator from among the first actuator and the second actuator to provide first vibration feedback to inform the event, in response to the event. The processor may be configured to receive, through the sensor, a touch input from contact to the button while the first vibration feedback is provided. The touch input may be received to cease providing the first vibration feedback. The processor may be configured to control the first actuator to cease providing the first vibration feedback and control the second actuator to provide second vibration feedback to inform that the touch input is processed, in response to the touch input. The second vibration feedback may be provided to an input to the button.

DETAILED DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
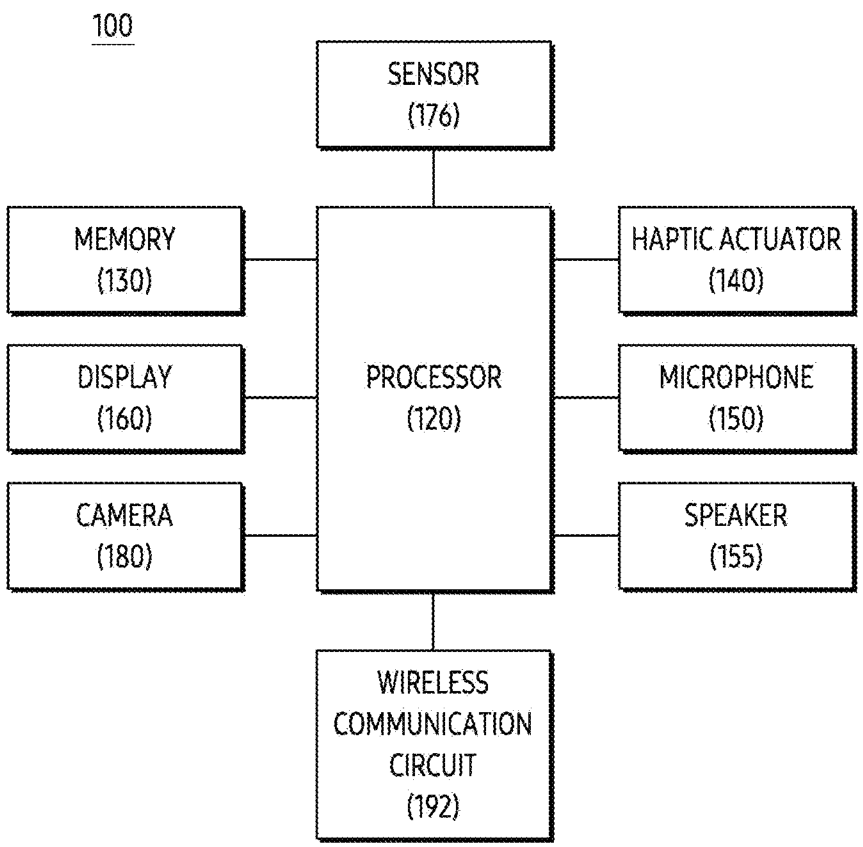
FIG. 1 is a block diagram of an example electronic device according to various embodiments.

FIG. 1 is a block diagram of an example electronic device according to various embodiments.

Referring to FIG. 1, an electronic device 100 may include a memory 130, a display 160, a camera 180, a sensor 176, a wireless communication circuit 192, a haptic actuator 140, a microphone 150, a speaker 155, and a processor 120 operatively coupled thereto.

According to an embodiment, the processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may include a main processor (e.g., a central processing unit or an application processor). Additionally, the processor 120 may include an auxiliary processor (e.g., a graphics processing unit, a neural processing unit (NPU), an image signal processor, a sensor hub processor, or a communication processor) that may operate independently or together with the main processor. The auxiliary processor may be set to use lower power than the main processor or to specialize in a designated function. The auxiliary processor may be implemented separately from, or as a part of, the main processor. The auxiliary processor may, for example, on behalf of the main processor while the main processor is in an inactive (e.g., sleep) state or together with the main processor while the main processor is in an active (e.g., application execution) state, control at least some of a function or states related to at least one component of the components of the electronic device 100 (e.g., the display 160, the sensor 176, or the wireless communication circuit 192). According to an embodiment, the auxiliary processor (e.g., the image signal processor or the communication processor) may be implemented as a part of another functionally related component (e.g., the camera 180 or the wireless communication circuit 192). In an embodiment, the processor 120 may be referred to as at least one processor.

In an embodiment, the processor 120 may, for example, by executing software (e.g., program), control at least one other component (e.g., hardware or software component) of the electronic device 100 connected to the processor 120, and perform various data processing or calculations. According to an embodiment, as at least part of the data processing or calculation, the processor 120 may store a command or data received from other component (e.g., the sensor 176 or the wireless communication circuit 192) in the memory 130, process the command or data stored in the memory 130, and store result data in a non-volatile memory.

In an embodiment, the memory 130 may store various data used by at least one component (e.g., the processor 120 or the sensor 176) of the electronic device 100. Data may include, for example, software (e.g., program), a command related thereto, input data or output data for the command. The memory 130 may include a volatile or non-volatile memory.

In an embodiment, the display 160 may visually provide information to an outside (e.g., a user) of the electronic device 100.

In an embodiment, the speaker 155 may output an acoustic signal to the outside of the electronic device 100. The speaker 155 may be used to output an audio notification or a call sound, or to play multimedia or a recorded file.

In an embodiment, the microphone 150 may obtain external sound by converting a sound into an electrical signal. For example, a voice of the user may be obtained by the microphone 150 during a phone call.

In an embodiment, the sensor 176 may include a touch sensor and/or a pressure sensor. For example, the sensor 176 may detect a gesture and pressure of a touch input of the user, and generate an electrical signal or data value corresponding to the detected touch input.

In an embodiment, the haptic actuator 140 may convert an electrical signal into a mechanical stimulation (e.g., haptic feedback such as vibration) that the user may perceive through a tactile sense. The haptic actuator 140 may include, for example, a linear resonant actuator, an eccentric rotating mass, a piezoelectric actuator, a coil motor, or an acoustic plate, but is not limited thereto.

In an embodiment, the camera 180 may photograph a still image and/or a moving image. According to an embodiment, the camera 180 may include one or more lenses, image sensors, image signal processors, or flashes.

In an embodiment, the wireless communication circuit 192 may support performing wireless communication between the electronic device 100 and an external electronic device and/or a server. For example, the electronic device 100 (or the processor 120) may communicate with the external electronic device and/or the server through various networks using the wireless communication circuit 192. As a non-limited example, the various networks may include a near-field communication network such as Bluetooth, wireless fidelity (Wi-Fi) direct, or infrared data association (IrDA), and long-range communication networks such as a cellular network, a 5G network, a next-generation communication network, the Internet, or a computer network (e.g., LAN or WAN).

Figure 2:
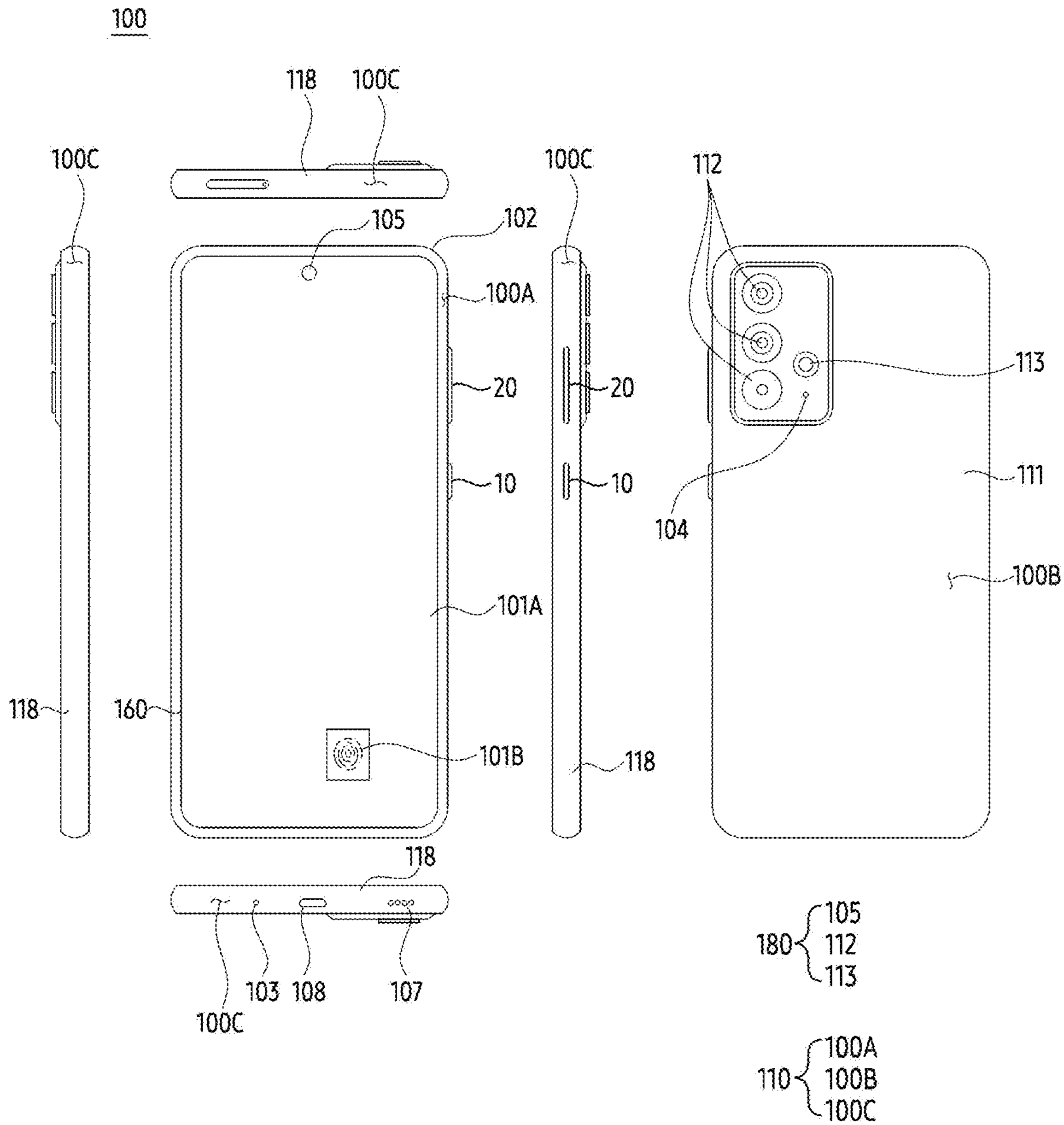
FIG. 2 is a diagram illustrating an example electronic device according to various embodiments.

FIG. 2 is a diagram illustrating an example electronic device according to various embodiments. Hereinafter, an overlapping description of a configuration having the same reference numerals as the above-described component may not be repeated.

Referring to FIG. 2, an electronic device 100 according to an embodiment may include a housing 110 that forms an exterior of the electronic device 100. For example, the housing 110 may include a first side (or front surface) 100A, a second side (or rear surface) 100B, and a third side (or side surface) 100C surrounding a space between the first side 100A and the second side 100B.

The electronic device 100 according to an embodiment may include a substantially transparent front plate 102. In an embodiment, the front plate 102 may form at least a part of the first side 100A. In an embodiment, the front plate 102 may include, for example, a glass plate or a polymer plate, including various coating layers, but is not limited thereto.

The electronic device 100 according to an embodiment may include a substantially opaque rear plate 111. In an embodiment, the rear plate 111 may form at least a part of the second side 100B. In an embodiment, the rear plate 111 may be formed of coated or colored glass, ceramic, polymer, metal (e.g., aluminum, stainless steel (STS), or magnesium), or a combination of at least two of the foregoing materials.

The electronic device 100 according to an embodiment may include a side bezel structure (e.g., a side member, frame, or bracket) 118. In an embodiment, the side bezel structure 118 may form at least a part of the third side 100C of the electronic device 100 by being coupled to the front plate 102 and/or the rear plate 111. For example, the side bezel structure 118 may form the entire third side 100C of the electronic device 100, and for another example, the side bezel structure 118 may form the third side 100C of the electronic device 100 together with the front plate 102 and/or the rear plate 111.

In an embodiment, the side bezel structure 118 may include metal and/or polymer. In an embodiment, the rear plate 111 and the side bezel structure 118 may be formed integrally, and may include the same material (e.g., a metal material such as aluminum), but are not limited thereto. For example, the rear plate 111 and the side bezel structure 118 may be formed in separate configurations and/or may include different materials.

In an embodiment, the housing 110 may refer, for example, to a structure that forms at least a part of the first side 100A, the second side 100B, and/or the third side 100C. For example, at least a part of the front plate 102, the side bezel structure 118, and/or the rear plate 111 forming the exterior of the electronic device 100 may be referred to as the housing 110 of the electronic device 100.

In an embodiment, the display 160 may be visually exposed through a substantial part of the front plate 102. For example, at least a part of the display 160 may be visible through the front plate 102 forming the first side 100A. The display 160 may be disposed on a rear surface of the front plate 102.

In an embodiment, the display 160 (or the first side 100A of the electronic device 100) may include a screen display area 101A. In an embodiment, the display 160 may provide visual information to a user through the screen display area 101A. In an embodiment, the screen display area 101A may include a sensing area 101B configured to obtain biometric information of the user. Herein, "the screen display area 101A includes the sensing area 101B" may refer to, for example, at least a part of the sensing area 101B being overlapped with the screen display area 101A. For example, the sensing area 101B may refer to, for example, an area in which visual information may be displayed by the display 160, like other areas of the screen display area 101A, and additionally obtain the biometric information of the user (e.g., fingerprint).

In an embodiment, the display 160 may be coupled to or disposed adjacent to a touch sensing circuit, a pressure sensor capable of measuring the intensity (pressure) of the touch, and/or a digitizer that detects a magnetic field-type stylus pen.

In an embodiment, the camera 180 may include a first camera 105 facing the first side 100A, a second camera 112 facing the second side 100B, and a flash 113. In an embodiment, the first camera 105 and the second camera 112 may include one or a plurality of lenses, an image sensor, and/or an image signal processor.

In an embodiment, the first camera 105 may be disposed in one area of the display 160. For example, an opening may be formed in one area of the display 160, and the first camera 105 may be at least partially disposed in the opening to face the first side 100A. In this case, the screen display area 101A of the display 160 may surround at least a part of an edge of the opening, but the disclosure is not limited in this respect. For example, the first camera 105 may be disposed under the display 160 to overlap the screen display area 101A of the display 160 (e.g., an under display camera (UDC)).

In an embodiment, the second camera 112 may include a plurality of cameras (e.g., a dual camera, a triple camera, or a quad camera). However, the second camera 112 is not necessarily limited to including a plurality of cameras, and may include one camera.

In an embodiment, the flash 113 may include, for example, a light emitting diode or a xenon lamp. In an embodiment, two or more lenses (an infrared camera, a wide-angle lens, and a telephoto lens) and image sensors may be disposed on one surface of the electronic device 100.

In an embodiment, the electronic device 100 may include microphone holes 103 and 104 and a speaker hole 107. The microphone holes 103 and 104 may include a first microphone hole 103 formed in a partial area of the third side 100C and a second microphone hole 104 formed in a partial area of the second side 100B. A microphone (e.g., the microphone 150 of FIG. 1) for obtaining an external sound may be disposed inside the microphone holes 103 and 104. The microphone may include a plurality of microphones to detect a direction of sound, but the disclosure is not limited in this respect.

In an embodiment, the second microphone hole 104 formed in the partial area of the second side 100B may be disposed adjacent to the first camera 105 and/or the second camera 112. As a non-limiting example, the second microphone hole 104 may obtain sound according to operation of the first camera 105 and/or the second camera 112.

In an embodiment, the speaker hole 107 may be formed in a part of the third side 100C of the electronic device 100. In an embodiment, the speaker hole 107 may be integrated into the microphone hole 103, and the speaker hole 107 and the microphone hole 103 may be implemented as one hole.

The electronic device 100 may include a call receiver hole (not illustrated). The call receiver hole may be formed in another part of the third side 100C. For example, the call receiver hole may be formed on the third side 100C opposite side of the external speaker hole 107. For example, based on the illustration in FIG. 2, the speaker hole 107 may be formed on the third side 100C corresponding to a lower end of the electronic device 100, and the call receiver hole may be formed on the third side 100C corresponding to an upper end of the electronic device 100. However, the disclosure it is not limited in this respect. For example, the call receiver hole may be formed in a location other than the third side 100C. For example, the call receiver hole may be formed by a spaced space between the front plate 102 (or the display 160) and the side bezel structure 118.

In an embodiment, sound outputted from a speaker (e.g., the speaker 155 of FIG. 1) of the electronic device 100 may be transmitted to an outside of the housing 110 through the speaker hole 107 and/or the call receiver hole. The speaker of the electronic device 100 may be formed singularly or in plural numbers. For example, in a case that the speaker is formed in plural, the electronic device 100 may include a speaker connected to the speaker hole 107 (e.g., a loudspeaker) and a speaker connected to the call receiver hole (e.g., an earpiece speaker).

In an embodiment, the electronic device 100 may include a first button 10 and a second button 20. The first button 10 and the second button 20 may be disposed on the third side 100C of the electronic device 100. For example, the first button 10 and the second button 20 may partially form the third side 100C of the electronic device 100. As a non-limiting example, a part of the third side 100C formed by the first button 10 and/or the second button 20 may be formed without a substantial step from another part of the third side 100C. As a non-limiting example, the first button 10 and/or the second button 20 may at least partially form a planar area of the third side 100C. The first button 10 and the second button 20 may be configured to receive a touch input of the user. In an embodiment, the first button 10 may be referred to as a first sensor input unit, and the second button 20 may be referred to as a second sensor input unit.

In an embodiment, a connector hole 108 may be formed on the third side 100C of the electronic device 100 such that a connector of an external device may be accommodated. A connection terminal electrically connected to the connector of the external device may be disposed in the connector hole 108. The electronic device 100 according to an embodiment may include an interface for processing an electrical signal transmitted and received through the connection terminal.

Although the electronic device 100 having a bar shape is illustrated in FIG. 2, it is not limited thereto. For example, the electronic device 100 may be implemented as a foldable device that may be folded around at least one axis. For another example, the electronic device 100 may be implemented as a slidable device whose size may be expanded or reduced by sliding.

Figure 3:
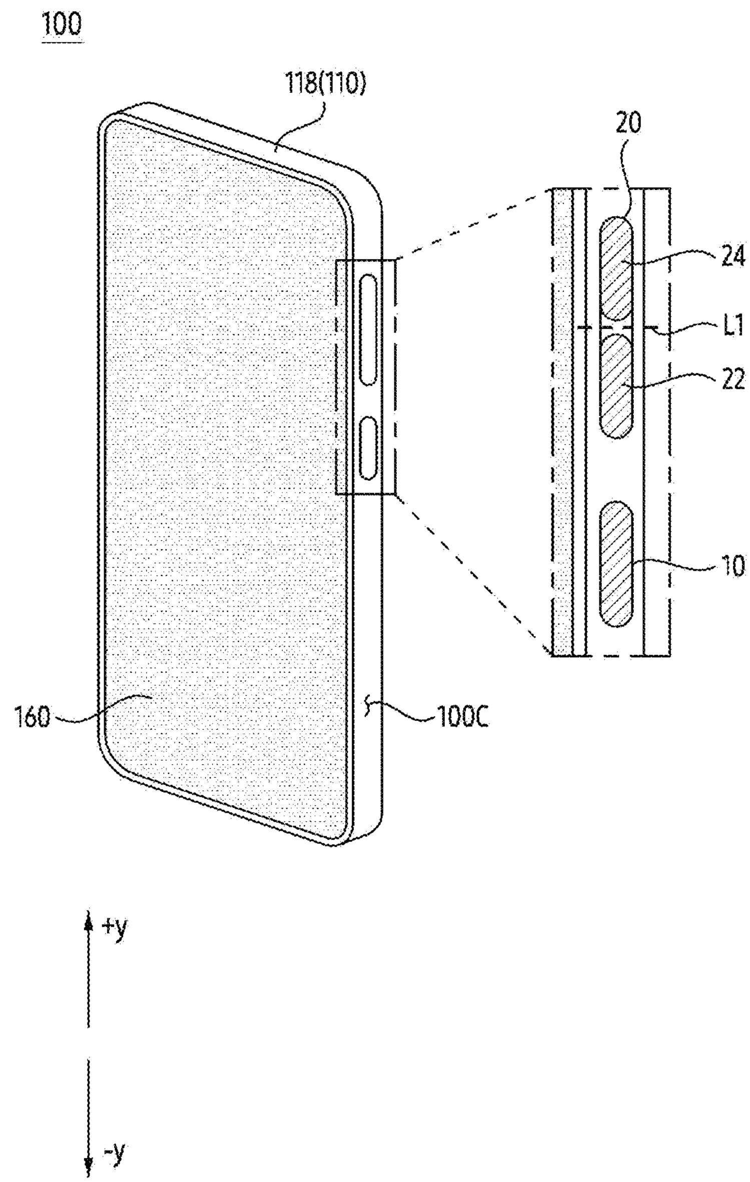
FIG. 3 is a diagram illustrating an example electronic device according to various embodiments.
Figure 4A:
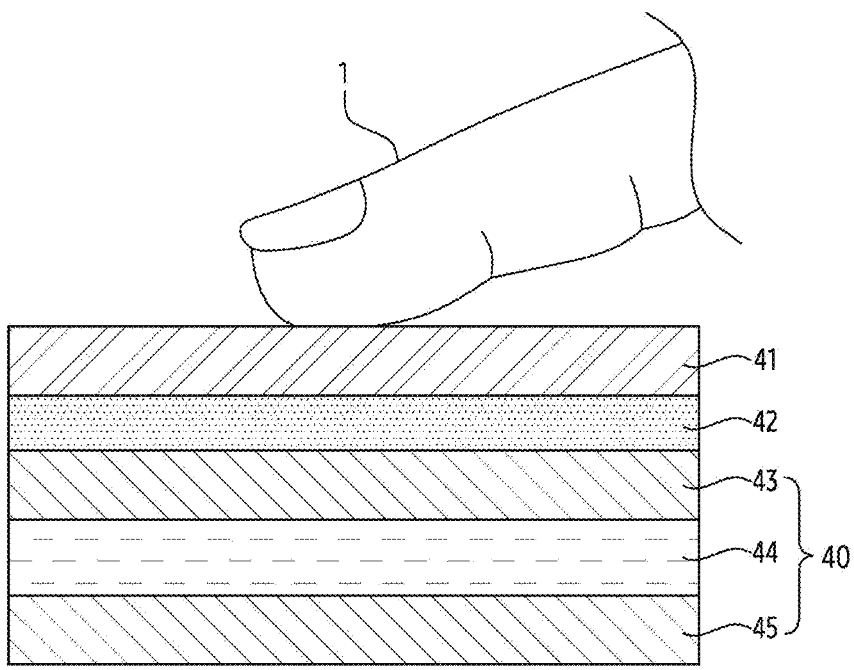
FIG. 4A illustrates an example sensor for detecting a gesture and pressure of a touch input according to various embodiments.
Figure 4B:
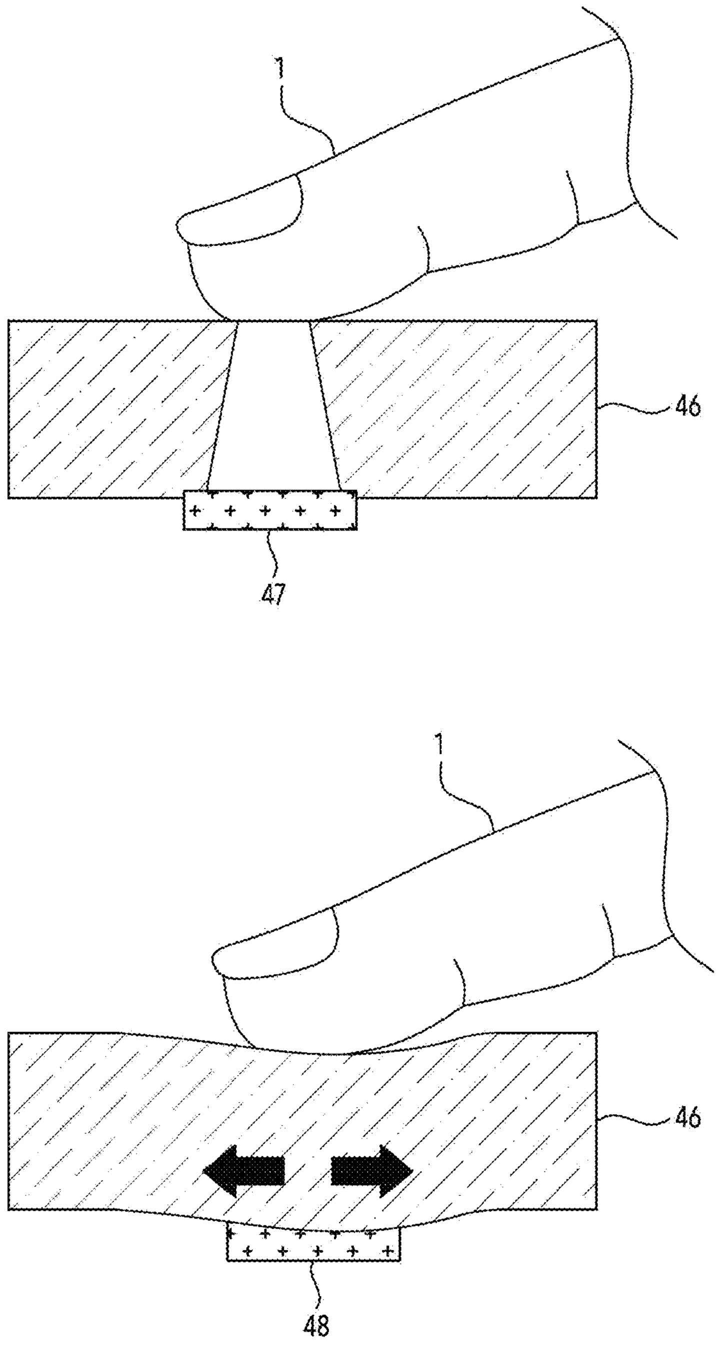
FIG. 4B illustrates an example sensor for detecting a gesture and pressure of a touch input according to various embodiments.

FIG. 3 is a diagram illustrating an example electronic device according to various embodiments. FIG. 4A illustrates an example sensor for detecting a gesture and pressure of a touch input according to various embodiments. FIG. 4B illustrates an example sensor for detecting a gesture and pressure of a touch input according to various embodiments.

Referring to FIG. 3, a first button 10 and a second button 20 according to an embodiment may be at least partially accommodated in an opening formed in a side bezel structure 118. The first button 10 and the second button 20 may be exposed to an outside of an electronic device 100. The first button 10 and the second button 20 may form a third side 100C of the electronic device 100 together with the side bezel structure 118.

In an embodiment, the second button 20 may be spaced apart from the first button 10. The second button 20 may include a first area 22 and a second area 24. The first area 22 may be located closer to the first button 10 than the second area 24. In other words, the first area 22 may be located between the first button 10 and the second area 24.

In an embodiment, the first button 10 and the second button 20 may be aligned along one axis (e.g., y-axis) on the third side 100C of the electronic device 100. The first area 22 and the second area 24 of the second button 20 may be divided based on a line segment L1 perpendicular to the one axis and passing through a center of the second button 20. For example, the first area 22 of the second button 20 may be located in a first direction (e.g., −y direction) from the line segment L1, and the second area 24 may be located in a second direction (e.g., +y direction) opposite to the first direction from the line segment L1. However, the division between the first area 22 and the second area 24 is not limited by the above-described example.

The electronic device 100 according to an embodiment may not include a dome switch that generates an electrical signal by forming a closed circuit in a case that the first button 10 and/or the second button 20 is pressed.

The electronic device 100 according to an embodiment may receive a touch input of a user through the first button 10 and the second button 20. For example, a sensor of the electronic device 100 (e.g., the sensor 176 of FIG. 1) may be configured to detect a gesture and pressure of a touch input of a user 1 to the first button 10 and the second button 20.

For example, referring to FIG. 4A, an electronic device 100 may include a sensor 40 (e.g., the sensor 176 of FIG. 1) attached under a button 41 through an adhesive 42. The sensor 40 may include a sensor circuit 43 formed on a substrate 44 and facing the button 41. The sensor circuit 43 may include a capacitive sensor and a force sensor. The capacitive sensor may include a structure in which electrode pads are arranged in an X-axis and a Y-axis in one or two layers. In a case that a touch input of a user 1 is made to the button 41, the capacitive sensor may detect a change in capacitance that changes in the electrode pads. Through this, the sensor 40 may detect a gesture of the touch input of the user 1. The force sensor may detect that internal resistance, capacitance, or inductance changes when pressure is applied to the button 41. Through this, the sensor 40 may detect the pressure of the user 1 touch input to the button 41. Additionally or optionally, the sensor 40 may include a shielding layer 45 disposed on a rear surface of the substrate 44. The button 41 may include, for example, a first button 10, a first area 22 of a second button 20, and a second area 24 of a second button 20 of FIG. 3.

In an embodiment, referring to FIG. 4B, the electronic device 100 may include an ultrasonic sensor 47 (e.g., the sensor 176 of FIG. 1) disposed under a button 46. The ultrasonic sensor 47 may transmit and receive ultrasonic waves through the button 46. The ultrasonic sensor 47 may detect the intensity of the received ultrasonic wave. The ultrasonic sensor 47 may detect whether the user 1 makes a touch input on the button 46 according to a change in the intensity of the received ultrasonic wave. In addition, the electronic device 100 may include a force sensor 48 (e.g., the sensor 176 of FIG. 1) disposed under the button 46. The force sensor 48 may detect deformation of an area of the button 46 where a touch of the user 1 is made by being configured in a form of a strain gauge. Through this, the force sensor 48 may detect the pressure of the touch input of the user 1 to the button 46. The ultrasonic sensor 47 may be formed in plural numbers to detect the gesture of the touch input of the user 1. The force sensor 48 may be formed in plural numbers to detect the pressure of a location where the touch of the user 1 is made. The button 46 may include, for example, the first button 10, the first area 22 of the second button 20, and the second area 24 of the second button 20 of FIG. 3.

However, the configuration of the sensor for detecting the gesture and pressure of the touch input is not limited to the above-described examples, and various sensors may be applied. For example, a piezoelectric sensor that generates a voltage according to deformation due to contact and pressure may be applied. In this case, the piezoelectric sensor may be at least partially integrated with a piezoelectric actuator that provides haptic feedback.

In an embodiment, a sensor for detecting a gesture and pressure of a touch input to the first button 10 may be referred to as at least one first sensor. In an embodiment, a sensor for detecting a gesture and pressure of a touch input to the second button 20 may be referred to as at least one second sensor.

Figure 5A:
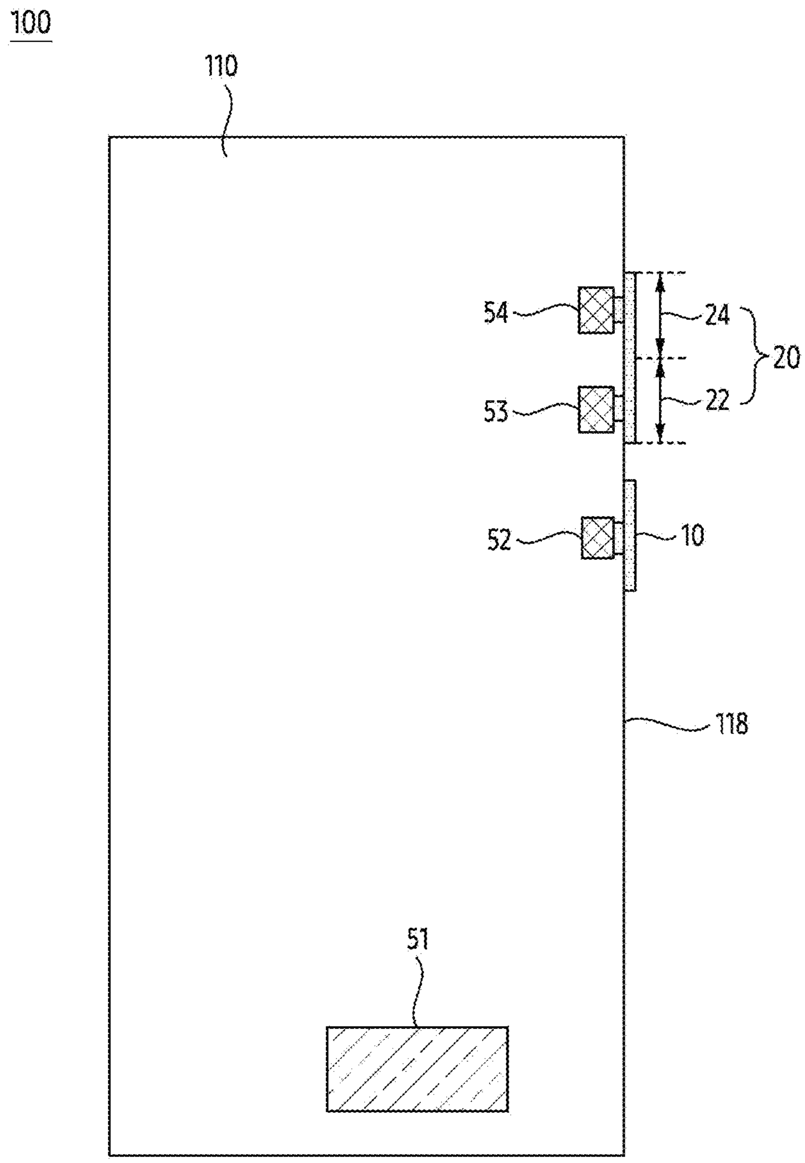
FIG. 5A is a plan view illustrating an example electronic device according to various embodiments.
Figure 5B:
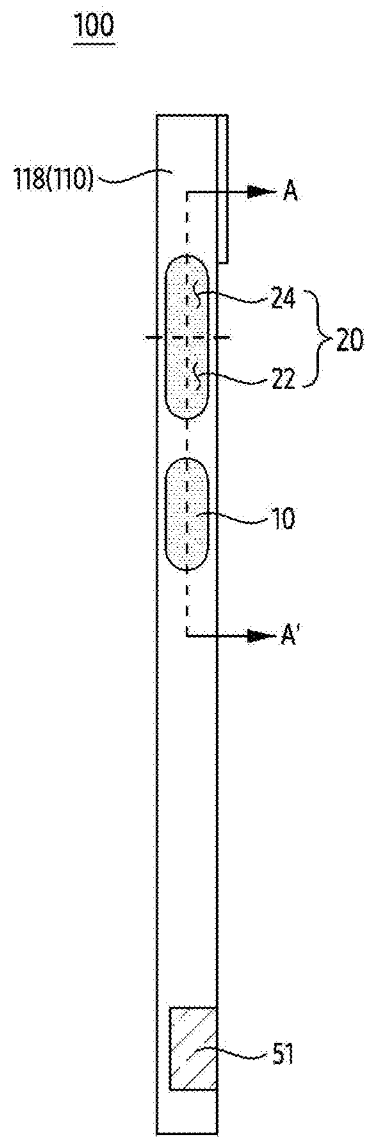
FIG. 5B is a side view illustrating an example electronic device according to various embodiments.
Figure 5C:
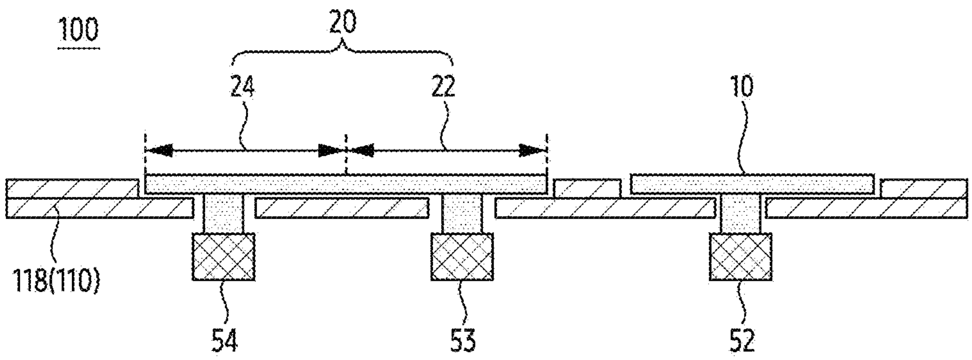
FIG. 5C is a cross-sectional view taken along line A-A' of FIG. 5B.

FIG. 5A is a plan view illustrating an example electronic device according to various embodiments. FIG. 5B is a side view illustrating an example electronic device according to various embodiments. FIG. 5C is a cross-sectional view taken along line A-A' of FIG. 5B.

Referring to FIGS. 5A, 5B, and 5C, an electronic device 100 (or the haptic actuator 140 of FIG. 1) according to an embodiment may include a first haptic actuator 51, a second haptic actuator 52, a third haptic actuator 53, and a fourth haptic actuator 54. The first haptic actuator 51, the second haptic actuator 52, the third haptic actuator 53, and the fourth haptic actuator 54 may be disposed in a housing 110.

In an embodiment, the first haptic actuator 51 may be disposed at a location spaced apart from a first button 10 and a second button 20. Haptic feedback generated by the first haptic actuator 51 may be transmitted to the entire housing 110.

In an embodiment, the second haptic actuator 52 may be coupled to the first button 10. For example, the second haptic actuator 52 may be connected to the first button 10. For example, the second haptic actuator 52 may be in contact with the first button 10. Haptic feedback generated by the second haptic actuator 52 may be transmitted to the first button 10. The fact that the second haptic actuator 52 is connected or in contact with the first button 10 may include a concept of not only being directly connected or contacted, but also being indirectly connected or contacted. Being indirectly connected or contacted may include, for example, being connected or contacted through another configuration such that a vibration generated by the second haptic actuator 52 may be transmitted to the first button 10. As a non-limiting example, the first button 10 and the housing 110 may be at least partially spaced apart in order to be transmitted to only the first button 10, which is capable of the haptic feedback of the second haptic actuator 52.

In an embodiment, the third haptic actuator 53 may be coupled to the second button 20. For example, the third haptic actuator 53 may be coupled to a first area 22 of the second button 20. For example, the third haptic actuator 53 may be connected to the first area 22 of the second button 20. For example, the third haptic actuator 53 may be in contact with the first area 22 of the second button 20. Haptic feedback provided by the third haptic actuator 53 may be transmitted to the first area 22 of the second button 20. Through this, a user may most strongly feel the haptic feedback provided by the third haptic actuator 53 in the first area 22 of the second button 20. The fact that the third haptic actuator 53 is connected or in contact with the first area 22 of the second button 20 may include a concept of not only being directly connected or contacted, but also being indirectly connected or contacted. Being indirectly connected or contacted may include, for example, being connected or contacted through another configuration such that a vibration generated by the third haptic actuator 53 may be transmitted to the first area 22 of the second button 20.

In an embodiment, the fourth haptic actuator 54 may be coupled to the second button 20. For example, the fourth haptic actuator 54 may be coupled to a second area 24 of the second button 20. For example, the fourth haptic actuator 54 may be connected to the second area 24 of the second button 20. For example, the fourth haptic actuator 54 may be in contact with the second area 24 of the second button 20. Haptic feedback provided by the fourth haptic actuator 54 may be transmitted to the second area 24 of the second button 20. Through this, the user may most strongly feel the haptic feedback provided by the fourth haptic actuator 54 in the second area 24 of the second button 20. The fact that the fourth haptic actuator 54 is connected or in contact with the second area 24 of the second button 20 may include a concept of not only being directly connected or contacted, but also being indirectly connected or contacted. Being indirectly connected or contacted may include, for example, being connected or contacted through another configuration such that a vibration generated by the fourth haptic actuator 54 may be transmitted to the second area 24 of the second button 20.

In an embodiment, the second button 20 and the housing 110 may be at least partially spaced apart in order to be transmitted only to the second button 20, which is capable of haptic feedback generated by the third haptic actuator 53 and the fourth haptic actuator 54, but is not limited thereto.

In an embodiment, the electronic device 100 may not include the fourth haptic actuator 54. In this case, the third haptic actuator 53 may be connected to the second button 20 to evenly transmit haptic feedback to the first area 22 and the second area 24 of the second button 20. Alternatively, the electronic device 100 may not include the first button 10 and the second haptic actuator 52.

Figure 6:
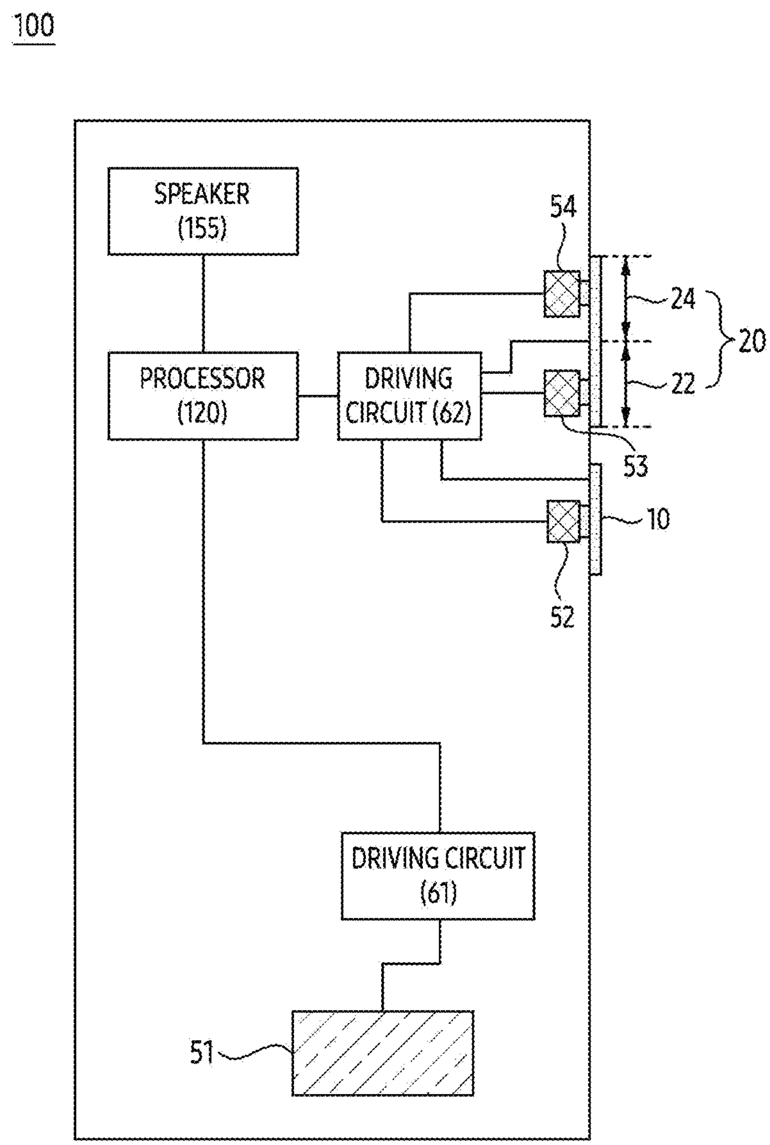
FIG. 6 is a plan view illustrating an example electronic device according to various embodiments.

FIG. 6 is a plan view illustrating an example electronic device according to various embodiments. Referring to FIG. 6, an electronic device 100 according to an embodiment may include driving circuits 61 and 62 connected to a processor 120.

In an embodiment, the processor 120, a speaker 155, and the driving circuits 61 and 62 may be disposed in a housing 110. The speaker 155 and the driving circuits 61 and 62 may be operatively coupled to the processor 120.

In an embodiment, the driving circuit 61 may be operatively coupled to a first haptic actuator 51. The driving circuit 61 may drive the first haptic actuator 51 based on a control signal applied from the processor 120.

In an embodiment, the driving circuit 62 may provide an electrical signal for a gesture and pressure of a touch input detected by the first button 10 to the processor 120 by being operatively coupled to the first button 10 (or a sensor coupled to the first button 10).

In an embodiment, the driving circuit 62 may provide an electrical signal for a gesture and pressure of a touch input detected by the second button 20 to the processor 120 by being operatively coupled to the second button 20 (or a sensor coupled to the second button 20).

In an embodiment, the driving circuit 62 may be operatively coupled to a second haptic actuator 52, a third haptic actuator 53, and a fourth haptic actuator 54. The driving circuit 62 may drive the second haptic actuator 52, the third haptic actuator 53, and the fourth haptic actuator 54 based on a control signal applied from the processor 120.

In an embodiment, the driving circuits 61 and 62 may be integrated into one circuit.

In an embodiment, the second haptic actuator 52 may output haptic feedback in response to an input of the first button 10. For example, in a case that the first button 10 is pressed (e.g., a touch or press input), the second haptic actuator 52 may provide a user with feedback representing that a clicking sensation of the first button 10 or a touch of the first button 10 is recognized.

In an embodiment, the third haptic actuator 53 may output haptic feedback in response to an input of a first area 22 of the second button 20. For example, in a case that the first area 22 of the second button 20 is pressed (e.g., the touch or press input), the third haptic actuator 53 may provide the user with feedback representing that a clicking sensation of the first area 22 of the second button 20 or a touch of the first area 22 of the second button 20 is recognized.

In an embodiment, the fourth haptic actuator 54 may output haptic feedback in response to an input of a second area 24 of the second button 20. For example, in a case that the second area 24 of the second button 20 is pressed (e.g., the touch or press input), the fourth haptic actuator 54 may provide the user with feedback representing that a clicking sensation of the second area 24 of the second button 20 or a touch of the second area 24 of the second button 20 is recognized.

In an embodiment, the third haptic actuator 53 and the fourth haptic actuator 54 may output haptic feedback in response to an input of the second button 20. For example, in a case that a swipe input is made to the second button 20, the third haptic actuator 53 and the fourth haptic actuator 54 may provide haptic feedback along a path of the swipe gesture.

Figure 7:
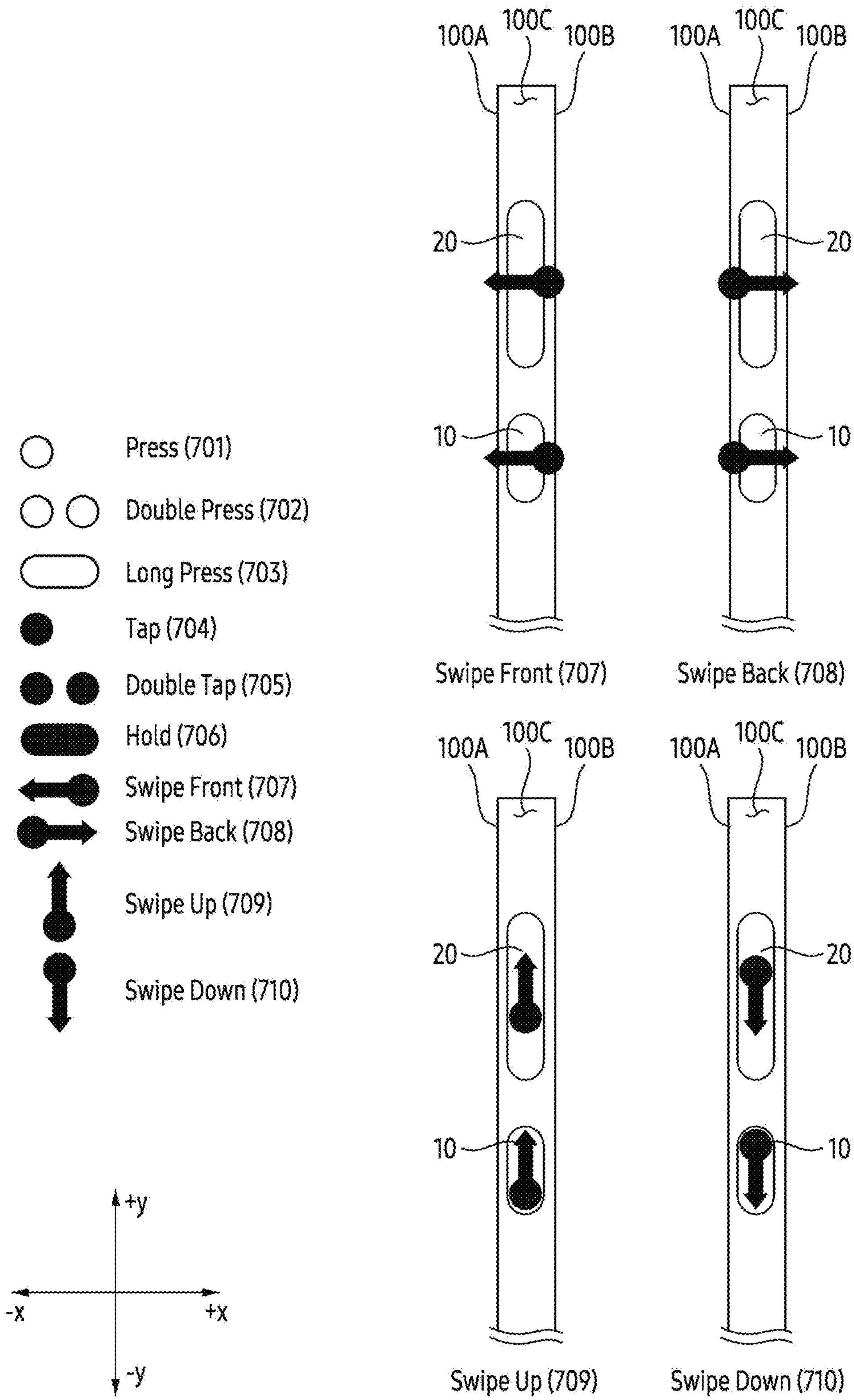
FIG. 7 is a diagram illustrating examples of a touch input, according to various embodiments.

FIG. 7 is a diagram illustrating examples of a touch input, according to various embodiments. An electronic device 100 (or the processor 120 of FIG. 6) according to an embodiment may detect a touch input to a first button 10 and/or a second button 20 (e.g., the first area 22 and the second area 24 of FIG. 6) and identify whether the detected touch input matches a designated touch input. The term 'designated' may, for example, be used interchangeably with the terms 'specified', 'preset', or 'predetermined'.

For example, referring to FIG. 7, the electronic device 100 may determine a gesture in which a contact exceeding a threshold pressure value is made at a specific point and the contact is released in an area substantially the same as the specific point or in a designated range as a press gesture 701. For example, the electronic device 100 may determine a gesture in which the press gesture 701 is performed twice at substantially the same point in a designated time interval as a double press gesture 702. Although not illustrated, the electronic device 100 may determine a gesture in which the press gesture 701 is performed n times in the designated time interval as an n-times press gesture.

For example, the electronic device 100 may determine a gesture in which, after a contact exceeding the threshold pressure value is maintained for the designated time or longer at a specific point, the contact is released in an area substantially the same as the specific point or in a designated range as a long press gesture 703.

For example, the electronic device 100 may recognize a press gesture 701 made simultaneously on two or more buttons (e.g., the first button 10 and the second button 20) as a combination press gesture.

For example, the electronic device 100 may recognize a gesture in which a contact below the threshold pressure value is made at a specific point and the contact is released in an area substantially the same as the specific point or in a designated range as a tap gesture 704. For example, the electronic device 100 may determine the tap gesture 704 made twice in a specific time interval as a double tap gesture 705. Although not illustrated, the electronic device 100 may determine the tap gesture made n times in the specific time interval as an n-times tap gesture.

For example, the electronic device 100 may determine a gesture in which, after a contact below the threshold pressure value is maintained for a designated time or longer at a specific point, the contact is released in an area substantially the same as the specific point or in a designated range as a hold gesture 706.

For example, the electronic device 100 may determine a drag gesture from a rear surface 100B toward a front surface 100A or a −x direction as a swipe front gesture 707. The drag gesture may be a gesture in which a contact starts at a first point, moves to a second point spaced apart from the first point while maintaining the contact, and releases the contact at the second point. For example, the electronic device 100 may determine a drag gesture from the front surface 100A toward the rear surface 100B or a +x direction as a swipe back gesture 708.

For example, the electronic device 100 may recognize a drag gesture in a direction from the bottom to the top of the electronic device 100 (e.g., +y direction) as a swipe up gesture 709, and determine a drag gesture in a direction from the top to the bottom of the electronic device 100 (e.g., −y direction) as a swipe down gesture 710.

Each of icons of the gestures 701, 702, 703, 704, 705, and 706 illustrated in FIG. 7 may refer, for example, to an input made at the same point. For example, the icons of the gestures 701, 702, 703, 704, 705, and 706 are only illustrated with the x-axis as the time axis, but do not refer to touch inputs made at different points. For example, the icon of the double press gesture 702 and the double tap gesture 705 illustrates touch inputs made twice at substantially the same point at time intervals and do not refer to, for example, sequential touch inputs for two different points or touch inputs made simultaneously for two different points. The illustrated icon of the long press gesture 703 and the hold gesture 706 illustrate a touch input sustained for a designated time at the same point, and do not refer, for example, to a drag input between two different points.

Icons of the gestures 707, 708, 709, and 710 illustrated in FIG. 7 may represent, for example, a movement path of the gesture, unlike the above-described gestures 701, 702, 703, 704, 705, and 706. For example, the icon of the gestures 707, 708, 709, and 710 may refer to, for example, a gesture in which initial contact is made in a circle and moves in a direction toward an end of an arrow while the contact is maintained.

Figure 8A:
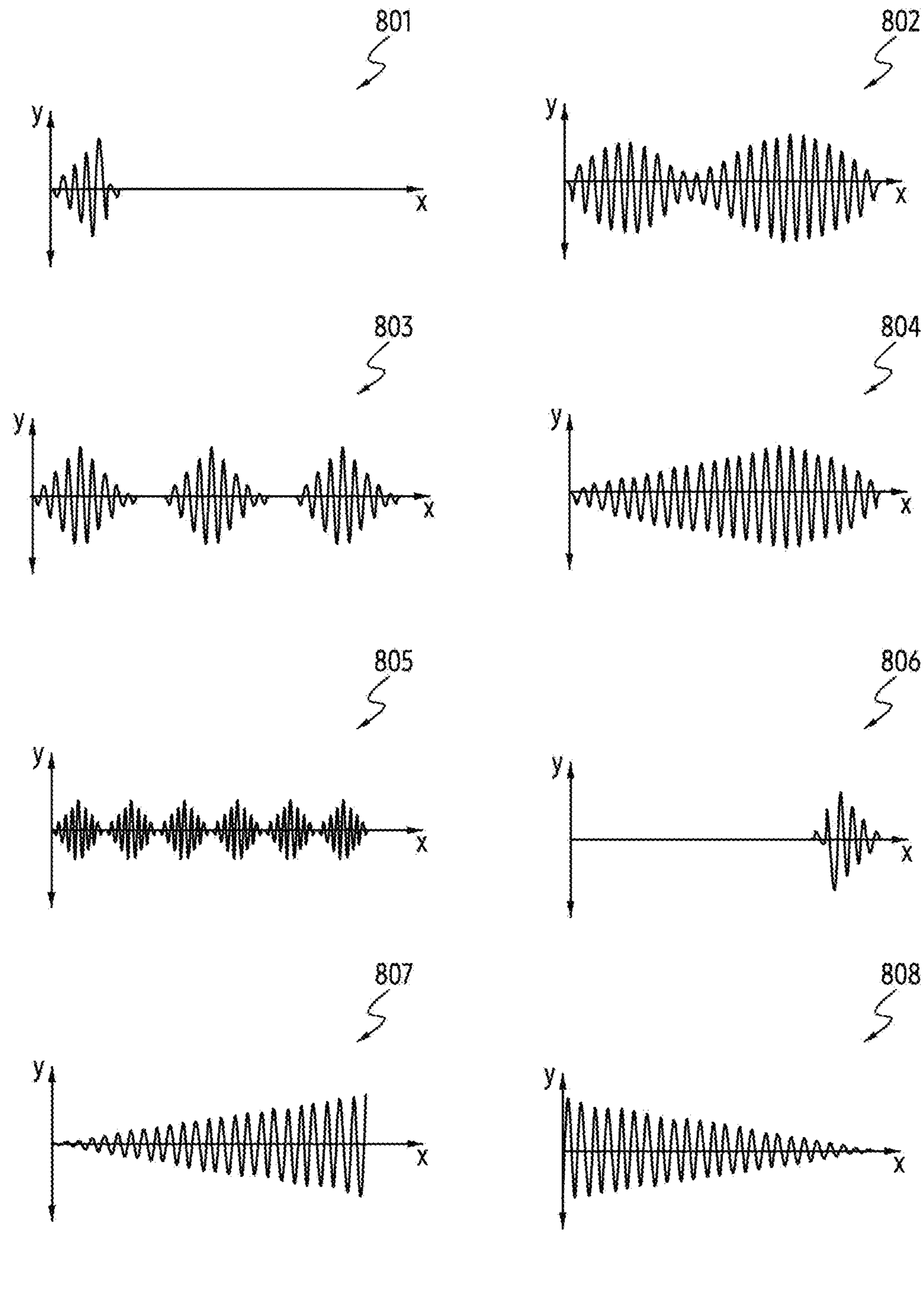
FIG. 8A is a diagram illustrating examples of a haptic feedback pattern according to various embodiments.

FIG. 8A is a diagram illustrating examples of a haptic feedback pattern according to various embodiments. A horizontal axis x of waveforms illustrated in FIG. 8A may represent, for example, a time axis extending from a start time point to an end time point, and a vertical axis y may represent, for example, amplitude of a vibration. Haptic feedback illustrated in FIG. 8A may be provided by the first haptic actuator 51, the second haptic actuator 52, the third haptic actuator 53, and/or the fourth haptic actuator 54 of FIG. 6.

Referring to FIG. 8A, a pattern 801 may, for example, inform a user of a preparation state before a specific function has started or is started by providing vibration feedback once at a time point closer to the start point than the end point.

A pattern 802 may, for example, inform the user of a failure or error in performing a specific function (e.g., a failure or error in recognizing a designated touch gesture) by continuously providing vibration feedback that increases or decreases over time.

A pattern 803 may, for example, represent a state of pause or provide feedback to the user for inducing execution by repeatedly providing vibration feedback at regular time intervals.

A pattern 804 may, for example, represent that the end of a specific function or operation is imminent by providing vibration feedback that gradually increases after the start time point and then decreases from the time point close to the end.

A pattern 805 may, for example, provide a sense of operation to the user by repeatedly providing weak vibration feedback in response to a touch input of the user. For example, the pattern 805 may provide feedback of an operation step when the user scrolls a page with a touch input or adjusts a dial-type setting. For example, while the user performs a swipe input (e.g., the swipe up gesture 709 of FIG. 7), a pattern 805 in which the same and fine vibration feedback is repeated may be provided.

A pattern 806 may, for example, inform the user that the currently executing function has ended by providing a one-time vibration pattern near the end time point.

A pattern 807 and a pattern 808 may, for example, provide feedback of increase and decrease or strength and weakness level to the user by providing a gradually increasing or decreasing vibration feedback. For example, the pattern 807 or the pattern 808 may be provided when adjusting an element (e.g., volume or brightness, page of a screen) that may be increased or decreased. For example, in a case that the element is increased, the pattern 807 that gradually increases from a weak sense of vibration to a strong sense of vibration may be provided. In a case that the element is decreased, the pattern 808 that gradually decreases from the strong sense of vibration to the weak sense of vibration may be provided. In a case that the adjustment of the element that may be increased or decreased reaches a highest point or a lowest point, feedback representing that the element may no longer be adjusted may be provided to the user by providing the pattern 806.

Figure 8B:
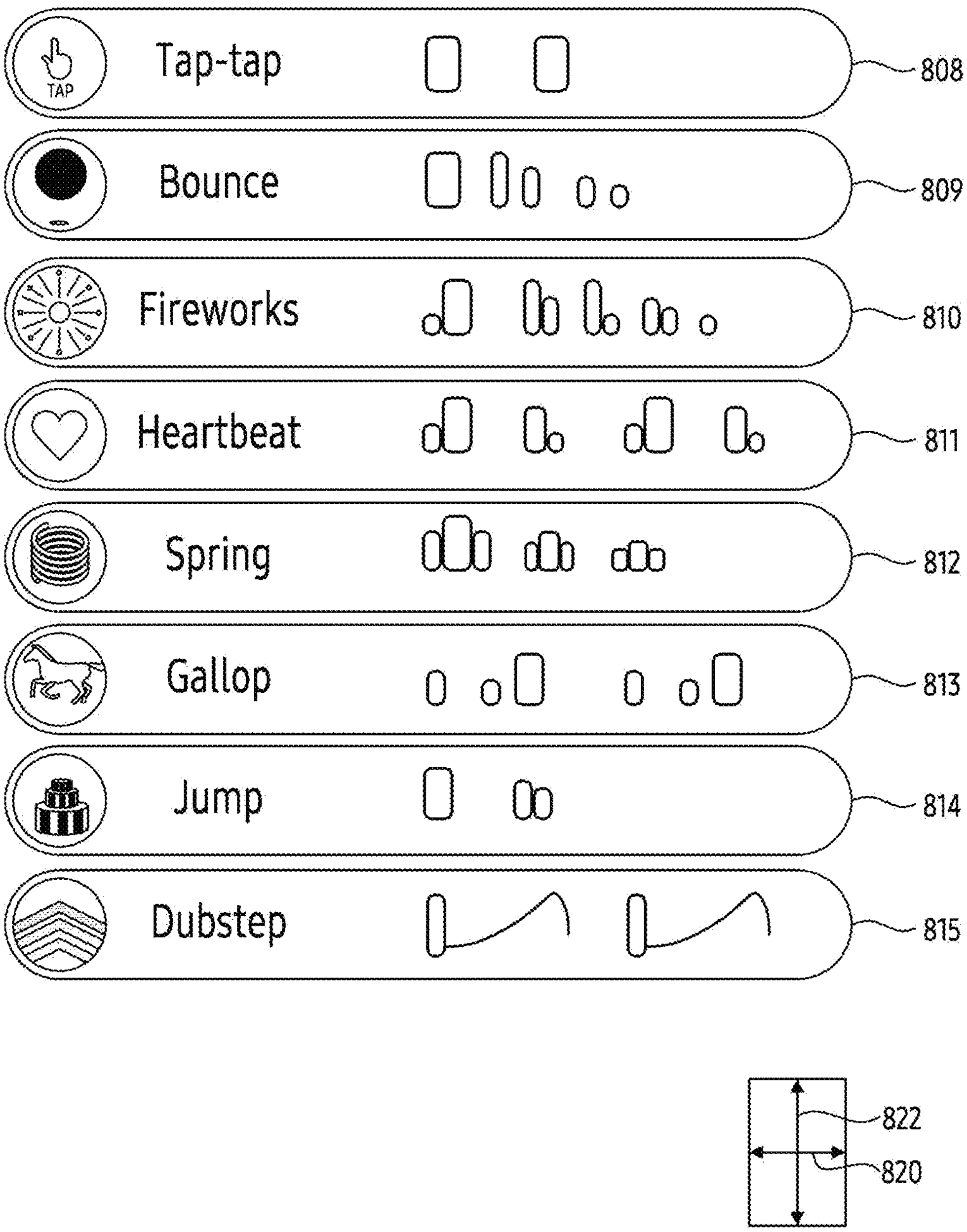
FIG. 8B is a diagram illustrating examples of a haptic feedback pattern, according to various embodiments.

FIG. 8B is a diagram illustrating examples of a haptic feedback pattern, according to various embodiments. A width 820 of a unit pattern illustrated in FIG. 8B may represent a time for which vibration is maintained, and a height 822 of the unit pattern may represent the intensity of the vibration. Haptic feedback illustrated in FIG. 8B may be provided by the first haptic actuator 51, the second haptic actuator 52, the third haptic actuator 53, and/or the fourth haptic actuator 54 of FIG. 6.

Referring to FIG. 8B, haptic feedback having various metaphors may be provided. For example, a pattern 808 that gives haptic feedback such as tapping, a pattern 809 that gives haptic feedback such as a ball bouncing, a pattern 810 that gives haptic feedback such as a firecracker exploding, a pattern 811 that gives haptic feedback such as a heart beating, a pattern 812 of haptic feedback such as a moving spring, a pattern 813 of haptic feedback such as a horse running, a pattern 814 that provides haptic feedback such as jumping, and a pattern 815 that provides a dubstep feeling may be provided.

A situation in which the patterns illustrated in FIGS. 8A and 8B are provided may be changed according to a setting of a user. For example, the user may set haptic feedback according to a progress stage of an application or service, or set haptic feedback according to a notification.

Figure 9A:
FIG. 9A is a diagram illustrating an example of controlling an event notification based on a user input according to various embodiments.
Figure 9B:
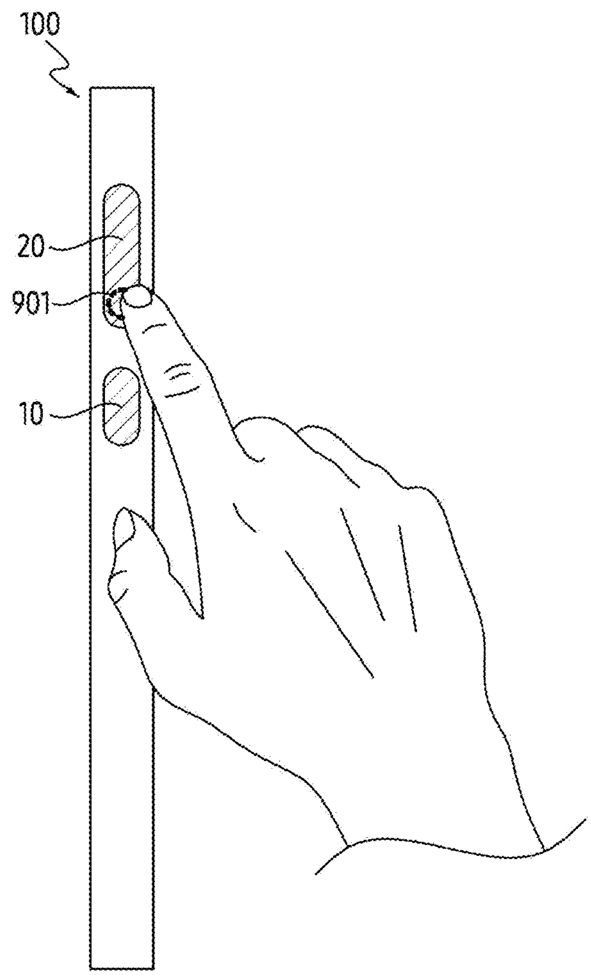
FIG. 9B is a diagram illustrating an example of controlling an event notification based on a user input according to various embodiments.
Figure 9C:
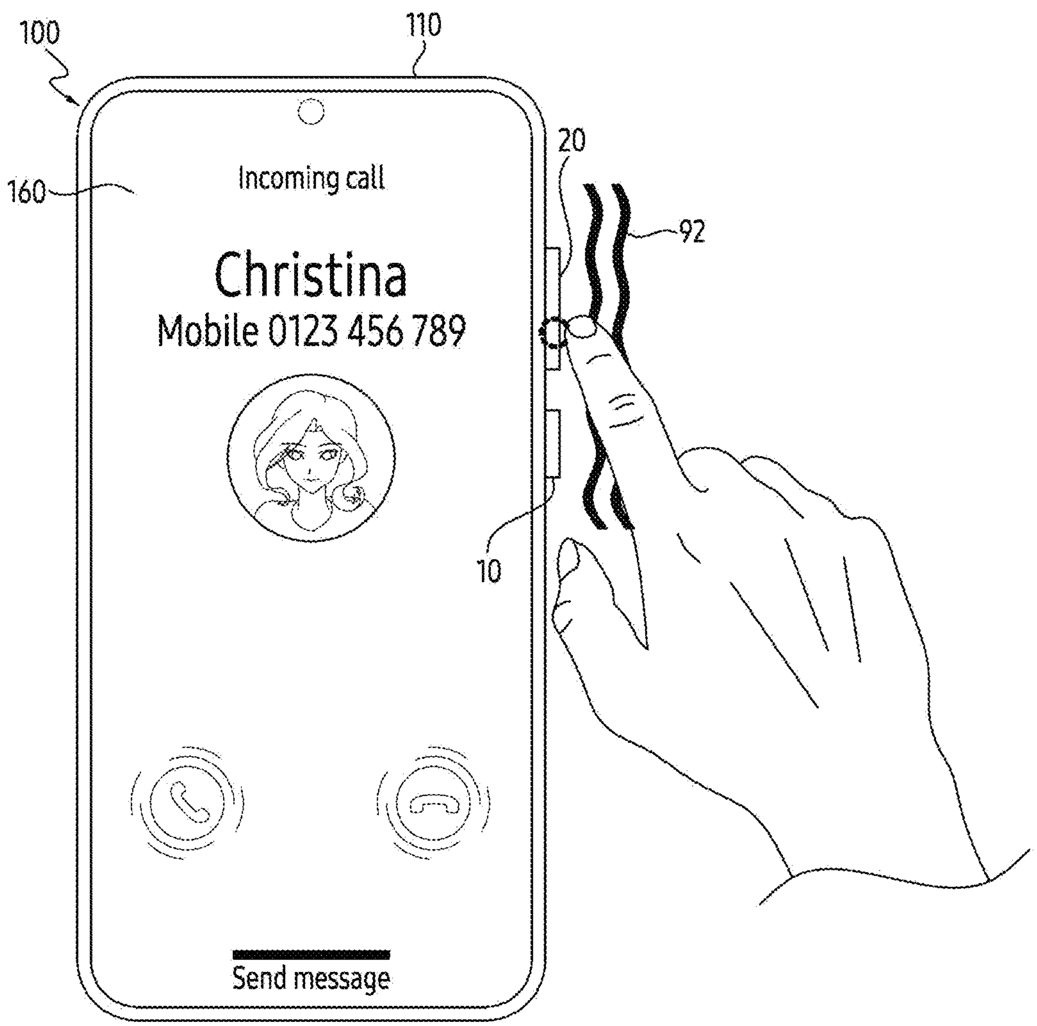
FIG. 9C is a diagram illustrating an example of controlling an event notification based on a user input according to various embodiments.

FIGS. 9A, 9B, and 9C are diagrams illustrating an example of controlling an event notification based on a user input according to various embodiments.

Referring to FIG. 9A together with FIG. 6, an electronic device 100 (or the processor 120 of FIG. 1) according to an embodiment may output a notification associated with a designated event. For example, the designated event may include an incoming call. The electronic device 100 may display a screen 161 including information on a sender of the incoming call on a display 160 as a notification of the incoming call. In addition, a speaker 155 and/or a first haptic actuator 51 of the electronic device 100 may provide a notification 91 of the incoming call in a form of an acoustic signal (e.g., a ringtone) and/or first haptic feedback (e.g., vibration).

Referring to FIG. 9B, the electronic device 100 may receive a user's touch input 901 on a first button 10 or a second button 20. For example, the electronic device 100 may receive the user's touch input 901 on the first button 10 or the second button 20 while the notification 91 is provided.

Referring to FIGS. 9A and 9C together with FIG. 6, the electronic device 100 may cease providing the notification 91 and provide second haptic feedback 92 based on a user touch input to the first button 10 or the second button 20. For example, the electronic device 100 may receive the user touch input to the first button 10 or the second button 20, and determine whether the received touch input matches (or corresponds to) a designated touch input. In response to determining that the received touch input matches the designated touch input, the electronic device 100 may cease providing the notification 91 and provide the second haptic feedback 92. In a case that the user touch input to the first button 10 or the second button 20 is not received or the received touch input does not match the designated touch input while the notification 91 is provided, the electronic device 100 may maintain providing the notification 91.

Additionally or optionally, in a case that the touch input received for the first button 10 or the second button 20 does not match the designated touch input, haptic feedback (e.g., the pattern 802 of FIG. 8A) representing a gesture recognition failure may be provided through the first button 10 or the second button 20. For example, in a case that the touch input received on the first button 10 does not match the designated touch input, haptic feedback representing a gesture recognition failure may be provided through the first button 10 (e.g., the second haptic actuator 52). For example, in a case that the touch input received in a first area 22 of the second button 20 does not match the designated touch input, haptic feedback representing a gesture recognition failure may be provided through the first area 22 (e.g., the third haptic actuator 53) of the second button 20. For example, in a case that the touch input received in a second area 24 of the second button 20 does not match the designated touch input, haptic feedback representing a gesture recognition failure may be provided through the second area 24 (e.g., the fourth haptic actuator 54) of the second button 20.

In an embodiment, operation in which the electronic device 100 ceases providing the notification 91 may be included in operation in which the processor 120 changes a state of the electronic device 100. For example, the electronic device 100 may include a first state in which both the speaker 155 and the first haptic actuator 51 are activated, a second state in which only one of the speaker 155 and the first haptic actuator 51 is activated, and a third state in which both the speaker 155 and the first haptic actuator 51 are inactivated (or deactivated). In an embodiment, the processor 120 may switch the state of the electronic device 100 from the first state or the second state to the third state such that providing the notification 91 is ceased.

In an embodiment, the designated touch input may include a hold gesture (e.g., the hold gesture 706 of FIG. 7) to the first button 10 or the second button 20, but is not limited thereto. For example, the designated touch input may include various gesture inputs (e.g., the gesture illustrated in FIG. 7) to the first button 10, the first area 22 or the second area 24 of the second button 20. For example, the electronic device 100 may generate the above-described event in response to detection of a touch input to the first button 10 or the second button 20. For example, the designated touch input may include a swipe up gesture (e.g., the swipe up gesture 709 of FIG. 7) or a tap gesture (e.g., the tap gesture 704 of FIG. 7) on the first button 10 or the second button 20. Alternatively or optionally, in response to receiving the touch input to the first button 10 or the second button 20, the electronic device 100 may cease providing the notification 91 and provide the second haptic feedback 92. As a non-limiting example, the electronic device 100 may provide the second haptic feedback 92 while the touch input to the first button 10 or the second button 20 is maintained. As a non-limiting example, the electronic device 100 may provide the second haptic feedback 92 for a predetermined time in response to the touch input to the first button 10 or the second button 20. As a non-limiting example, the electronic device 100 may cease providing the second haptic feedback 92 in response to a release of the touch input to the first button 10 or the second button 20. As a non-limiting example, the electronic device 100 may bypass controlling the second haptic actuator 52 to provide the second haptic feedback 92 based on the touch input being released before the second haptic feedback 92 is provided.

In an embodiment, the second haptic feedback 92 may be provided by the second haptic actuator 52, the third haptic actuator 53, or the fourth haptic actuator 54. For example, in a case that the designated touch input to the first button 10 is received, the second haptic actuator 52 may provide the second haptic feedback 92. For example, in a case that the designated touch input to the first area 22 of the second button 20 is received, the third haptic actuator 53 may provide the second haptic feedback 92. For example, in a case that the designated touch input to the second area 24 of the second button 20 is received, the fourth haptic actuator 54 may provide the second haptic feedback 92. The second haptic feedback 92 may tactually inform a recipient that the state of the electronic device 100 has been changed to the third state. The second haptic feedback 92 may include, for example, a designated vibration pattern (e.g., the pattern 801 of FIG. 8A).

Figure 10A:
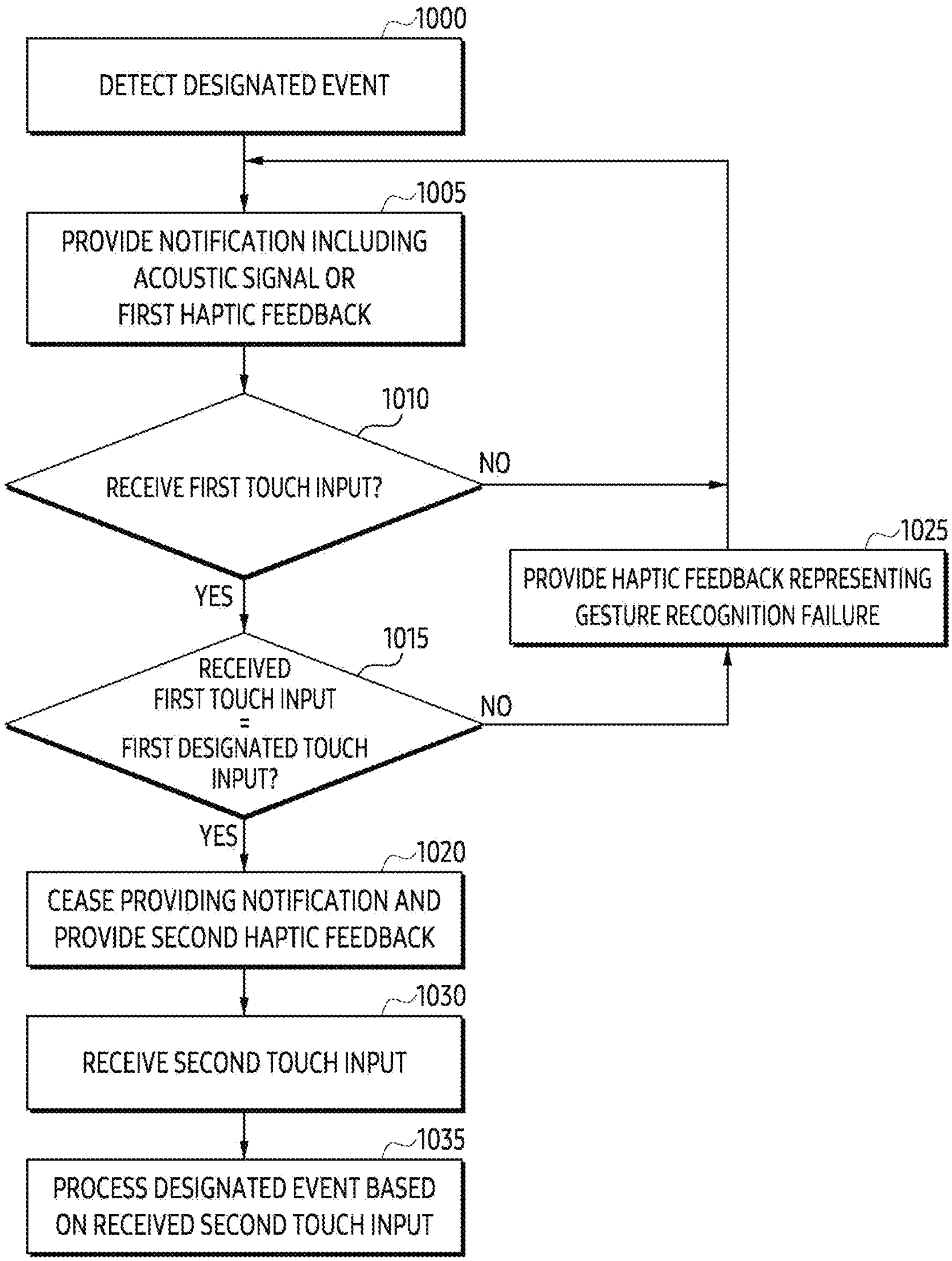
FIG. 10A is a flowchart of an example method of controlling an event notification based on a user input according to various embodiments.
Figure 10B:
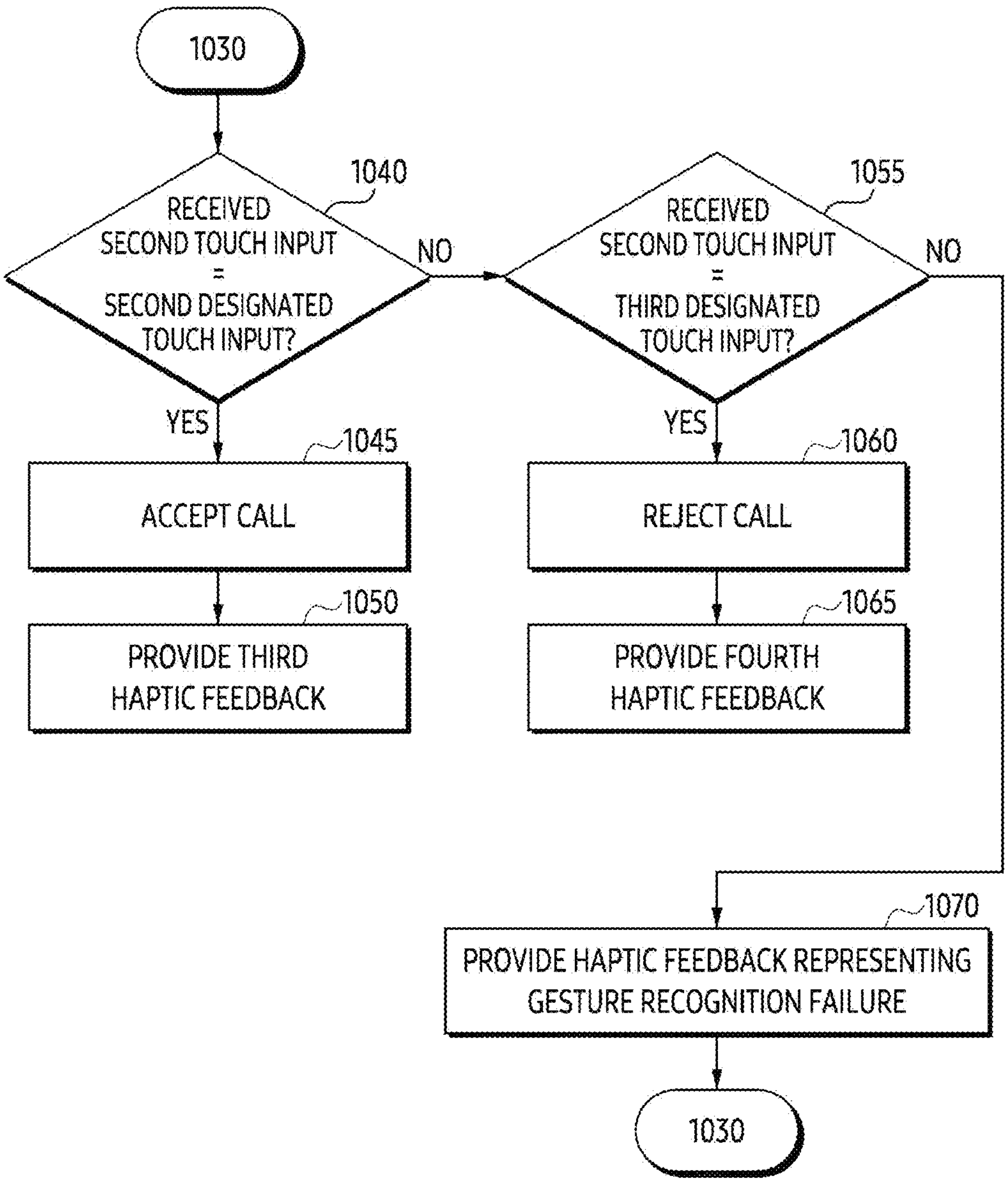
FIG. 10B is a flowchart illustrating example operation 1035 of FIG. 10A.

FIG. 10A is a flowchart of an example method of controlling an event notification based on a user input according to various embodiments. Operations of FIG. 10A and the following drawings may be performed sequentially, substantially simultaneously, or in parallel, or order of the operations may vary from order shown in the drawings. FIG. 10B is a flowchart illustrating example operation 1035 of FIG. 10A. A method of FIGS. 10A and 10B may be performed by an electronic device 100 of FIG. 6. For example, the method of FIGS. 10A and 10B may be controlled by processor 120 of FIG. 6.

Referring to FIG. 10A together with FIGS. 6, 9A, 9B, and 9C, in operation 1000, the processor 120 may detect a designated event. For example, the processor 120 may detect the designated event while the electronic device 100 is in an on state. The designated event may include, for example, an incoming call or receiving a message, but is not limited thereto.

In operation 1005, the processor 120 may provide a notification including an acoustic signal and/or first haptic feedback. For example, the processor 120 may provide a notification 91 in response to detection of the designated event. For example, the processor 120 may control a speaker 155 to output an acoustic signal associated with the designated event, and/or control a first haptic actuator 51 to output the first haptic feedback associated with the designated event. For example, the processor 120 may control to output the first haptic feedback by driving the first haptic actuator 51 in a case that the designated event occurs while the electronic device 100 is in the on state. The acoustic signal may include a preset ringtone (e.g., a default ringtone or a ringtone set by a user). The first haptic feedback may include a preset vibration pattern (e.g., a basic vibration pattern or a vibration pattern set by a user).

In operation 1010, the processor 120 may identify whether a first touch input has been received. For example, the processor 120 may identify whether the first touch input to a first button 10 or a second button 20 has been received. In a case that the first touch input to the first button 10 or the second button 20 is not received (operation 1010: No), the processor 120 may perform operation 1005. In a case that the first touch input to the first button 10 or the second button 20 is received (operation 1010: Yes), the processor 120 may perform operation 1015. Alternatively or optionally, the operation 1015 and operation 1025 may be omitted. In this case, in response to receiving the first touch input to the first button 10 or the second button 20 in the operation 1015, the processor 120 may perform operation 1020.

In the operation 1015, the processor 120 may determine whether the received first touch input matches (or corresponds to) a first designated touch input. For example, the processor 120 may determine whether they match by comparing a gesture of the received first touch input with the first designated touch input. The first designated touch input may include a hold input (e.g., the hold gesture 704 of FIG. 7) to the first button 10, a first area 22 of the second button 20, or a second area 24 of the second button 20, but is not limited thereto. For example, the first designated touch input may include various gesture inputs (e.g., the gestures of FIG. 7) to the first button 10, the first area 22 or the second area 24 of the second button 20. In a case that the received first touch input and the first designated touch input do not match (operation 1015: No), the processor 120 may perform the operation 1025. In a case that the received first touch input matches the first designated touch input (operation 1015: Yes), the processor 120 may perform the operation 1020.

In the operation 1025, the processor 120 may provide haptic feedback representing a gesture recognition failure. For example, in response to identifying that the first touch input received to the first button 10, the first area 22 of the second button 20, or the second area 24 of the second button 20 does not match the first designated touch input, the processor 120 may provide haptic feedback (e.g., the pattern 802 of FIG. 8A) representing a gesture recognition failure through the first button 10, the first area 22 of the second button 20, or the second area 24 of the second button 20. For example, an area of the button to which haptic feedback representing the gesture recognition failure is provided may correspond to an area of the button that received the first touch input. For example, in a case that the first touch input is received through the first button 10, the haptic feedback of a gesture recognition failure may be provided to the first button 10. The processor 120 may perform the operation 1005 after performing the operation 1025. For example, the processor 120 may maintain providing the notification 91.

In the operation 1020, the processor 120 may cease providing the notification and provide second haptic feedback. For example, in response to identifying that the first touch input received to the first button 10, the first area 22 of the second button 20, or the second area 24 of the second button 20 matches the first designated touch input, the processor 120 may cease providing the notification 91 including the acoustic signal and/or the first haptic feedback, and provide second haptic feedback 92 through the first button 10, the first area 22 of the second button 20, or the second area 24 of the second button 20. For example, in response to detecting the first designated touch input while the notification 91 including the first haptic feedback is provided, the processor 120 may control the speaker 155 to cease outputting of the acoustic signal and/or control the first haptic actuator 51 to cease the first haptic feedback. In addition, in response to detecting the first designated touch input while the notification 91 including the first haptic feedback is provided, the processor 120 may control a second haptic actuator 52 to output the second haptic feedback 92. For example, in response to detecting the first designated touch input while the notification 91 is being outputted, the processor 120 may convert a state of the electronic device 100 from the first state or the second state to the third state. A button (e.g., the first button 10, the first area 22 or the second area 24 of the second button 20) on which the second haptic feedback 92 is provided may correspond to a button that received the first designated touch input.

In an embodiment, the second haptic feedback 92 provided in the operation 1020 may be determined based on a sender of the designated event. For example, the designated event may be an event of receiving an incoming call or message triggered from a user other than the user of the electronic device 100. The processor 120 may identify whether an identification (ID) of the sender of the designated event matches at least one entry of a database of contacts. The processor 120 may determine the pattern of the second haptic feedback based on the identification result. For example, in a case that the ID of the sender matches an entry of the database of the contacts, the processor 120 may provide the second haptic feedback based on pattern information stored in the database of the contacts associated with the ID. The second haptic feedback may include a vibration pattern different from the first haptic feedback. For example, the user may store a pattern selected from among the patterns illustrated in FIG. 8B in association with the contacts. For example, the user may store a pattern 809 in family contacts or emergency contacts designated by the user, a pattern 810 in contacts of friends or coworkers, and a pattern 811 in advertising notifications. Accordingly, the user may easily determine who the sender of the event is through the second haptic feedback without looking at the screen. For example, in a case that the notification 91 rings in a place where it is difficult to see the screen, such as a movie theater or a conference room, the user can process the event by switching the notification 91 to the second haptic feedback and confirming who the other party is.

In operation 1030, the processor 120 may receive a second touch input. For example, the processor 120 may receive the second touch input to the first button 10, the first area 22 of the second button 20, or the second area 24 of the second button 20.

In operation 1035, the processor 120 may process the designated event based on the received second touch input. Whether to perform the operation 1035 may be preset by the user.

Referring to FIG. 10B, the operation 1035 of FIG. 10A may include operations 1040, 1045, 1050, 1055, 1060, 1065, and 1070. The operations of FIG. 10B may be performed after the operation 1030 of FIG. 10A.

In operation 1040, the processor 120 may determine whether the received second touch input matches (or corresponds to) the second designated touch input. For example, the processor 120 may determine whether they match by comparing the received second touch input with the second designated touch input. The second designated touch input may include, for example, a press input (e.g., the press gesture 701 of FIG. 7) to the second area 24 of the second button 20, but is not limited thereto. For example, the second designated touch input may include various gesture inputs (e.g., the gestures of FIG. 7) on the first button 10 and the first area 22 or the second area 24 of the second button. For example, the second designated touch input may be a press input to the first area 22 of the second button 20. In a case that the received second touch input and the second designated touch input do not match (operation 1040: No), the processor 120 may perform operation 1055. In a case that the received second touch input matches the second designated touch input (operation 1040: Yes), the processor 120 may perform operation 1045.

In the operation 1045, the processor 120 may accept a call. For example, in response to identifying that the received second touch input matches the second designated touch input, the processor 120 may accept the incoming call.

In operation 1050, the processor 120 may provide third haptic feedback. For example, in response to accepting the incoming call, the processor 120 may control the second haptic actuator 52, the third haptic actuator 53, or the fourth haptic actuator 54 to output the third haptic feedback. The third haptic feedback may include, for example, vibration feedback (e.g., the pattern 801 of FIG. 8A) representing that the call has been accepted. The third haptic feedback may be transmitted through a button (e.g., the first button 10 and the first area 22 or the second area 24 of the second button 20) that received the second designated touch input. That is, the user may accept the call via the second designated touch input and may simultaneously or immediately be provided the third haptic feedback regarding the call acceptance.

In the operation 1055, the processor 120 may determine whether the received second touch input matches (or corresponds to) a third designated touch input. For example, the processor 120 may determine whether they match by comparing a gesture of the received second touch input with the third designated touch input. The third designated touch input may include, for example, a press input (e.g., the press gesture 701 of FIG. 7) on the first button 10, but is not limited thereto. For example, the third designated touch input may include various gesture inputs (e.g., the gestures of FIG. 7) to the first area 22 or the second area 24 of the second button 20. For example, the third designated touch input may be a swipe down gesture (e.g., the swipe down gesture 710 of FIG. 7) on the first button 10. In a case that the received second touch input and the third designated touch input do not match (operation 1055: No), the processor 120 may perform operation 1070. In a case that the received second touch input matches the third designated touch input (operation 1055: Yes), the processor 120 may perform operation 1060.

In the operation 1060, the processor 120 may reject a call. For example, in response to identifying that the received second touch input matches the third designated touch input, the processor 120 may reject the incoming call.

In operation 1065, the processor 120 may provide fourth haptic feedback. For example, in response to rejecting the incoming call, the processor 120 may control the second haptic actuator 52, the third haptic actuator 53, or the fourth haptic actuator 54 to output the fourth haptic feedback. The fourth haptic feedback may include, for example, vibration feedback (e.g., the pattern 805 of FIG. 8A) representing that the call has been rejected. The fourth haptic feedback may be transmitted through a button (e.g., the first button 10 and the first area 22 or the second area 24 of the second button 20) that received the third designated touch input. That is, the user may reject the call via the third designated touch input and simultaneously or immediately receive the third haptic feedback for rejecting the call.

In the operation 1070, the processor 120 may provide haptic feedback representing a gesture recognition failure. For example, the processor 120 may control the second haptic actuator 52, the third haptic actuator 53, or the fourth haptic actuator 54 to output haptic feedback (e.g., the pattern 802 of FIG. 8A) representing a gesture recognition failure. For example, the haptic feedback of a gesture recognition failure may be provided through a button (e.g., the first button 10 and the first area 22 or the second area 24 of the second button 20) that received the second touch input. The processor 120 may perform the operation 1030 after performing the operation 1070.

Alternatively or optionally, the operation 1015 and/or the operation 1030 of FIG. 10A may be omitted. For example, in a case that the operation 1015 and the operation 1030 are omitted, the operations of FIG. 10B may be performed after the operation 1020 or substantially simultaneously with the operation 1020. As described above, in a case that the operation 1015 and the operation 1030 are omitted, the processor 120 may perform the operation 1020 in response to the first touch input received in the operation 1010. In addition, in the operation 1035, the processor 120 may process a designated event based on the received first touch input. The operation 1035 may be performed substantially simultaneously with the operation 1020 after performance of the operation 1010, or may be performed after performance of the operation 1020. In the operation 1040, the processor 120 may determine that the received first touch input matches the second designated touch input. The processor 120 may perform the operation 1045 (operation 1040: Yes) or the operation 1055 (operation 1040: No) according to a determination result. In the operation 1055, the processor 120 may determine whether the received first touch input matches the third designated touch input. The processor 120 may perform the operation 1060 (operation 1055: Yes) or the operation 1070 (operation 1055: No) according to the determination result. For example, in a case that the second designated touch input is a press input to the second area 24 of the second button 20, the processor 120 may receive the press input to the second area 24 as the first touch input in the operation 1010. In response to detecting the start of the press gesture input (e.g., an initial touch), the processor 120 may cease providing a notification and provide the second haptic feedback as in the operation 1020. In addition, after performing the operation 1010 (or the operation 1020), the processor 120 may determine whether the received first touch input matches the second designated touch input as in the operation 1040. Since the received first touch input and the second designated touch input match as a press input, the processor 120 may accept a call in the operation 1045.

Figure 11:
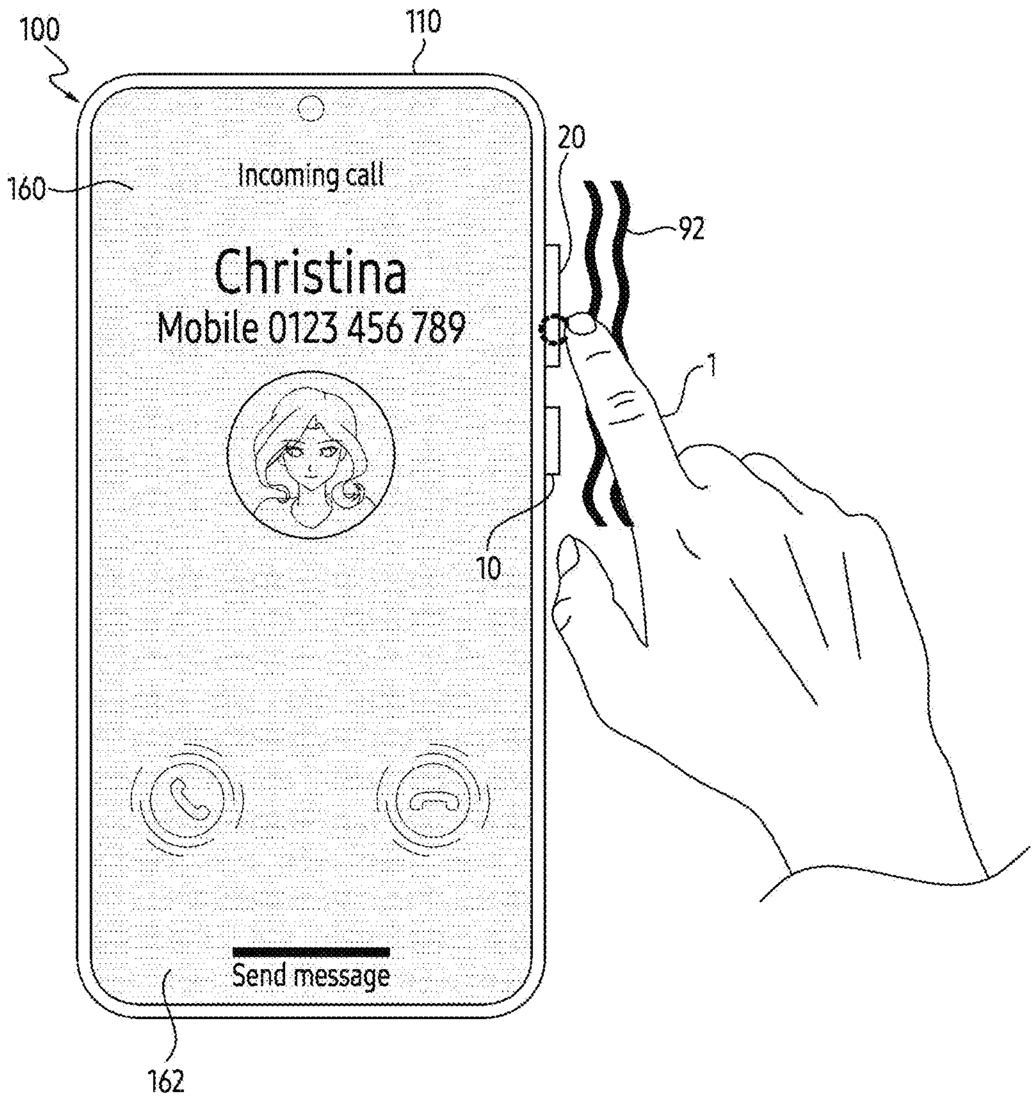
FIG. 11 is a diagram illustrating an example of controlling an event notification based on a user input according to various embodiments.

FIG. 11 is a diagram illustrating an example of controlling an event notification based on a user input according to various embodiments. First, referring to FIG. 9A, an electronic device 100 may display a screen 161 on a display 160 as a notification of the incoming call. The screen 161 may be displayed on the display 160 at a first brightness level.

Referring to FIG. 11 together with FIG. 9A, the electronic device 100 may cease providing a notification 91, and provide second haptic feedback 92 based on a user touch input to a first button 10 or a second button 20. In addition, the electronic device 100 may display a screen 162 on the display 160. The screen 162 may be a screen in which the brightness of the screen 161 is adjusted to a second brightness level less than the first brightness level.

Figure 12:
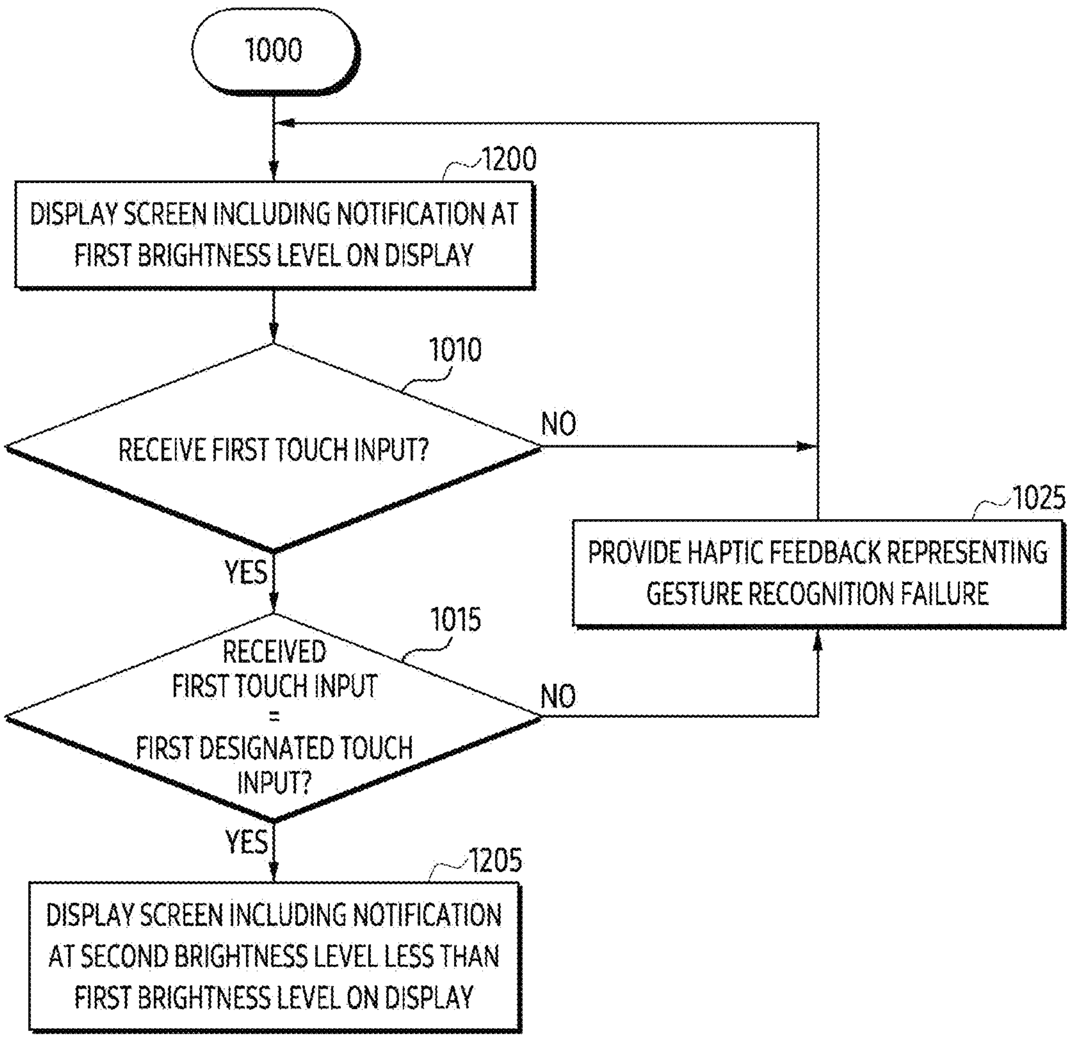
FIG. 12 is a flowchart of an example method of controlling an event notification based on a user input according to various embodiments.

FIG. 12 is a flowchart of an example method of controlling an event notification based on a user input according to an embodiment. A method of FIG. 12 may be performed by an electronic device 100 of FIG. 6. For example, the method of FIG. 12 may be controlled by a processor 120 of FIG. 6. Operation 1200 of FIG. 12 may be performed after operation 1000 of FIG. 10A. For example, the operation 1200 may be performed together with operation 1005 after the operation 1000 of FIG. 10A. In a case that 'No' is determined in operation 1010, the processor 120 may perform operation 1200. In a case that 'Yes' is determined in the operation 1010, the processor 120 may perform operation 1015. The processor 120 may perform operation 1205 in a case where 'YES' is determined in the operation 1015, otherwise may perform operation 1025. The operation 1205 may be performed together or independently with operations 1020, 1030, and 1035 of FIG. 10A. The processor 120 may perform the operation 1200 after performing the operation 1025.

Referring to FIG. 12 together with FIG. 11, in the operation 1200, the processor 120 may display a screen including a notification at a first brightness level on a display. For example, the processor 120 may display a screen 161 including a notification associated with a designated event on a display 160 at the first brightness level. For example, the designated event may include an incoming call, but is not limited thereto. The screen 161 may include a notification representing information on a sender of the incoming call.

In the operation 1205, the processor 120 may display the screen including the notification on the display at a second brightness level less than the first brightness level. For example, in response to identifying that a first touch input received on a first button 10, a first area 22 of a second button 20, or a second area 24 of the second button 20 matches the first designated touch input, the processor 120 may display the screen 161 on the display 160 at the second brightness level less than the first brightness level (e.g., the screen 162). For example, in response to detecting the first designated touch input while a notification 91 is provided, the processor 120 may display the screen 161 on the display 160 at the second brightness level less than the first brightness level. Through this, in a case that the notification 91 rings while watching a performance or movie or in a dark environment while sleeping, a user may reduce the brightness of the screen without interfering with other people's vision by touching the first button 10 or the second button 20.

In the operation 1205, operation in which the processor 120 reduces the brightness of the screen may be included in operation in which the processor 120 changes a mode of the display 160. For example, the processor 120 may change the mode of the display 160 to a low power mode or a dark mode such that the brightness of the screen is reduced.

Alternatively or optionally, operation 1015 and/or the operation 1025 of FIG. 12 may be omitted. In this case, the processor 120 may perform the operation 1205 after the operation 1010.

In an embodiment, the operations of FIG. 12 may be coupled to the operations of FIGS. 10A and 10B. For example, after performing the operation 1010 or the operation 1015, the processor 120 may perform operation 1020 and the operation 1205.

Figure 13A:
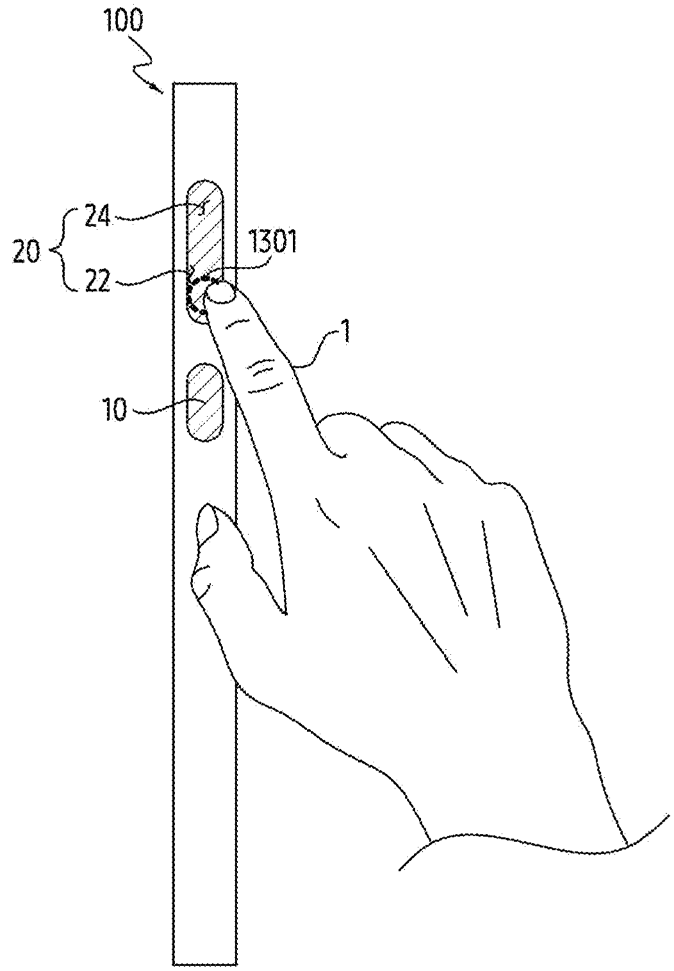
FIG. 13A is a diagram illustrating an example of controlling an event notification based on a user input according to various embodiments.
Figure 13B:
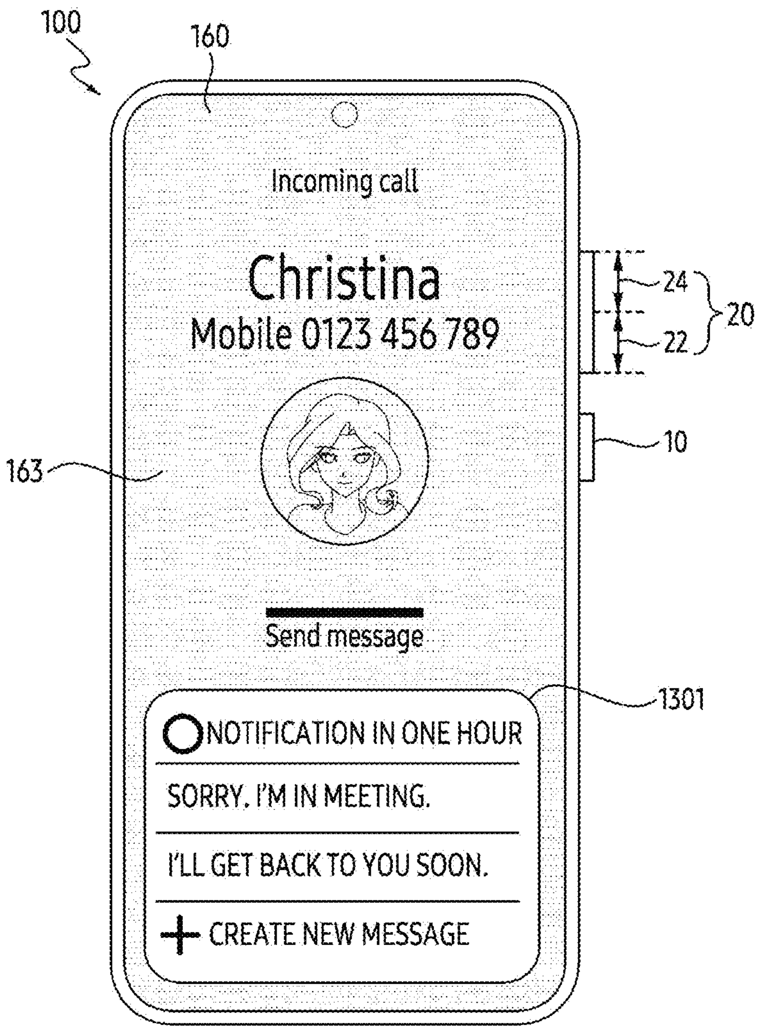
FIG. 13B is a diagram illustrating an example of controlling an event notification based on a user input according to various embodiments.

FIGS. 13A and 13B are diagrams illustrating an example of controlling an event notification based on a user input according to various embodiments.

Referring to FIG. 13A together with FIG. 9C, an electronic device 100 (or the processor 120 of FIG. 6) may receive a fourth designated touch input 1301 on a first button 10 and a first area 22 or a second area 24 of a second button 20 while a screen 161 including a notification associated with an event (e.g., incoming call or message reception) is being output. For example, the fourth designated touch input 1301 may include a swipe up gesture (e.g., the swipe up gesture 709 of FIG. 7) on the first button 10 and the first area 22 or the second area 24 of the second button 20, but is not limited thereto. For example, the fourth designated touch input 1301 may include various gesture inputs (e.g., the gestures of FIG. 7) on the first button 10 and the first area 22 or the second area 24 of the second button 20.

Referring to FIG. 13B, in a case of receiving the fourth designated touch input 1301, the electronic device 100 may display a selection menu 1301 on a display 160 as an overlay on a screen 163 including the notification associated with the event. The screen 163 may be the screen 161 of FIG. 9C or a screen 162 of FIG. 11. For example, the electronic device 100 may display the selection menu 1301 in an overlapping manner on a screen in which the brightness is maintained (e.g., the screen 161) or display the selection menu 1301 in an overlapping manner on a screen in which the brightness is reduced (e.g., the screen 162). In response to the display of the selection menu 1301, the electronic device 100 may provide haptic feedback (e.g., the pattern 801 of FIG. 8A) to a button (e.g., the first button 10 and the first area 22 or the second area 24 of the second button 20) that received the fourth designated touch input 1301. Through the haptic feedback, the user may tactually recognize that the selection menu 1301 has been successfully called.

In an embodiment, the selection menu 1301 may include a quick message list such as 'Sorry, I'm in a meeting' and 'I'll get back to you soon.' In addition, the selection menu 1301 may include a menu for writing a message directly by the user, such as '+Create new Message'. Any one of the selection menu 1301 may be selected through a touch input of the user (e.g., the swipe up or the swipe down gesture). In response to a touch input for selecting the selection menu 1301, haptic feedback (e.g., the pattern 805 of FIG. 8A) may be provided. A button (e.g., the first button 10 and the first area 22 or the second area 24 of the second button 20) on which the haptic feedback is provided may correspond to a button that receives the touch input. Thereafter, by the touch input of the user (e.g., the press input of the first button 10), a message corresponding to the selected item may be transmitted to the sender of the event, or a window for the user to directly input a message may be called.

Figure 14:
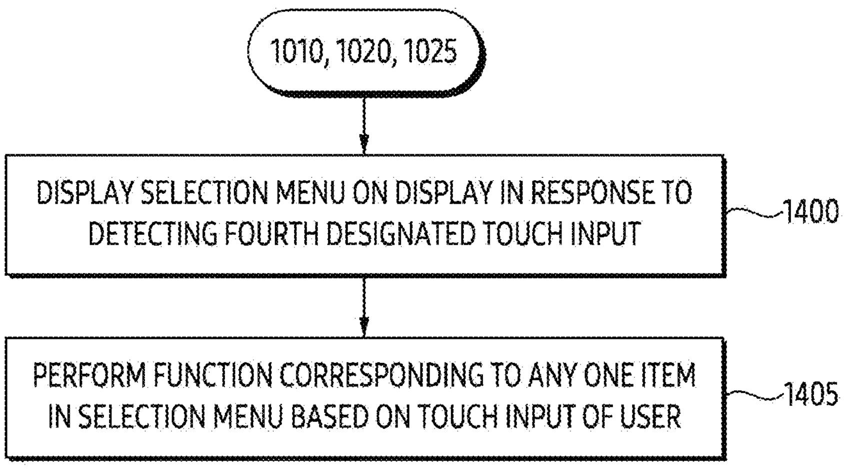
FIG. 14 is a flowchart of an example method of controlling an event notification based on a user input according to various embodiments.

FIG. 14 is a flowchart of an example method of controlling an event notification based on a user input according to various embodiments. A method of FIG. 14 may be performed by an electronic device 100 of FIG. 6. For example, the method of FIG. 14 may be controlled by a processor 120 of FIG. 6. Operations of FIG. 14 may be operations for the description provided with reference to FIGS. 13A and 13B.

Operation 1400 of FIG. 14 may be performed after operation 1010, operation 1020 of FIG. 10A, or operation 1205 of FIG. 12. For example, operation 1200 may be performed together with operation 1005 after operation 1000 of FIG. 10A.

Referring to FIG. 14 together with FIGS. 13A and 13B, in the operation 1400, the processor 120 may display a selection menu on a display in response to detecting a fourth designated touch input. For example, in response to detecting a fourth designated touch input 1301 while a screen 163 is being displayed, the processor 120 may display a selection menu 1301 on a display 160 overlapping the screen 163. Detection of the fourth designated touch input 1301 may be detected based on a first touch input received in the operation 1010, a second touch input received in operation 1040, a second touch input received in operation 1055, or another touch input distinct therefrom. For example, the processor 120 may receive the first touch input in the operation 1010 of FIG. 10A. In a case that operation 1015 is omitted, the processor 120 may perform the operation 1020 in response to the received first touch input. The processor 120 may perform the operation 1400 after performing the operation 1010. For example, in a case that the fourth designated touch input is a swipe up gesture to a second button 20, the processor 120 may receive a swipe up gesture input to a second area 24 to the second button 20 as the first touch input in the operation 1010. In response to detecting the start of the swipe up gesture input (e.g., the initial touch), the processor 120 may cease providing a notification and provide second haptic feedback as in the operation 1020. In addition, after performing the operation 1010 (or the operation 1020), the processor 120 may display the selection menu on the display in response to detecting the swipe up gesture input, which is the fourth designated touch input, as in the operation 1400. In operation 1405, the processor 120 may perform a function corresponding to any one item among the selection menu 1301 based on a touch input of a user. For example, the processor 120 may transmit a message corresponding to the item of the selection menu 1301 to a sender of the event, or call a window for writing a message to be sent to the sender, based on the touch input of the user.

Figure 15A:
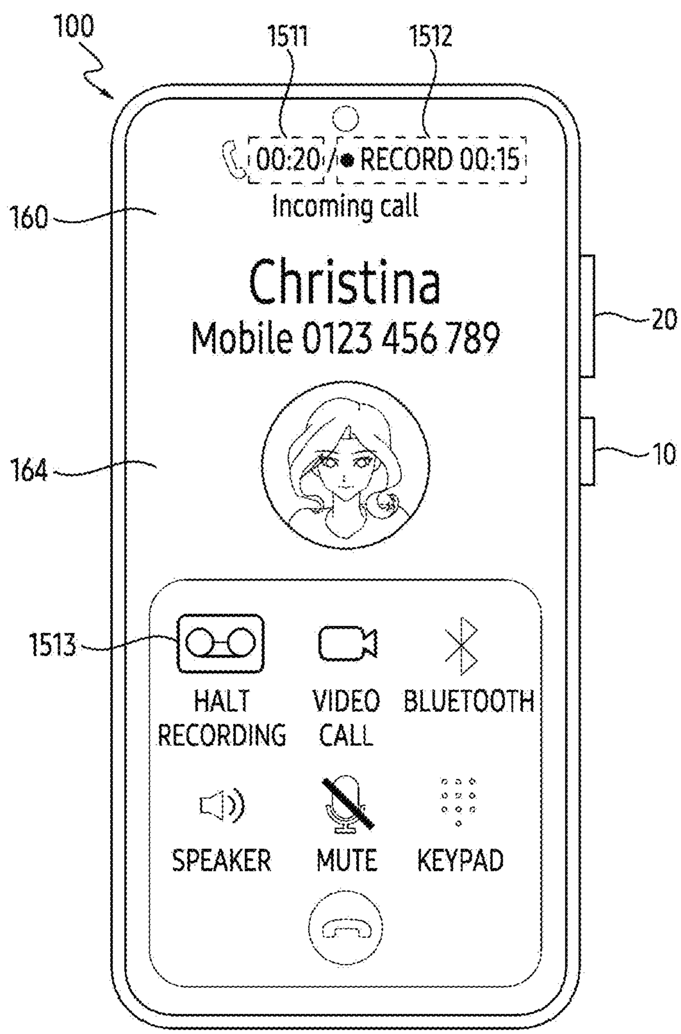
FIG. 15A is a diagram illustrating an example of ceasing recording of a voice call based on a user input, according to various embodiments.
Figure 15B:
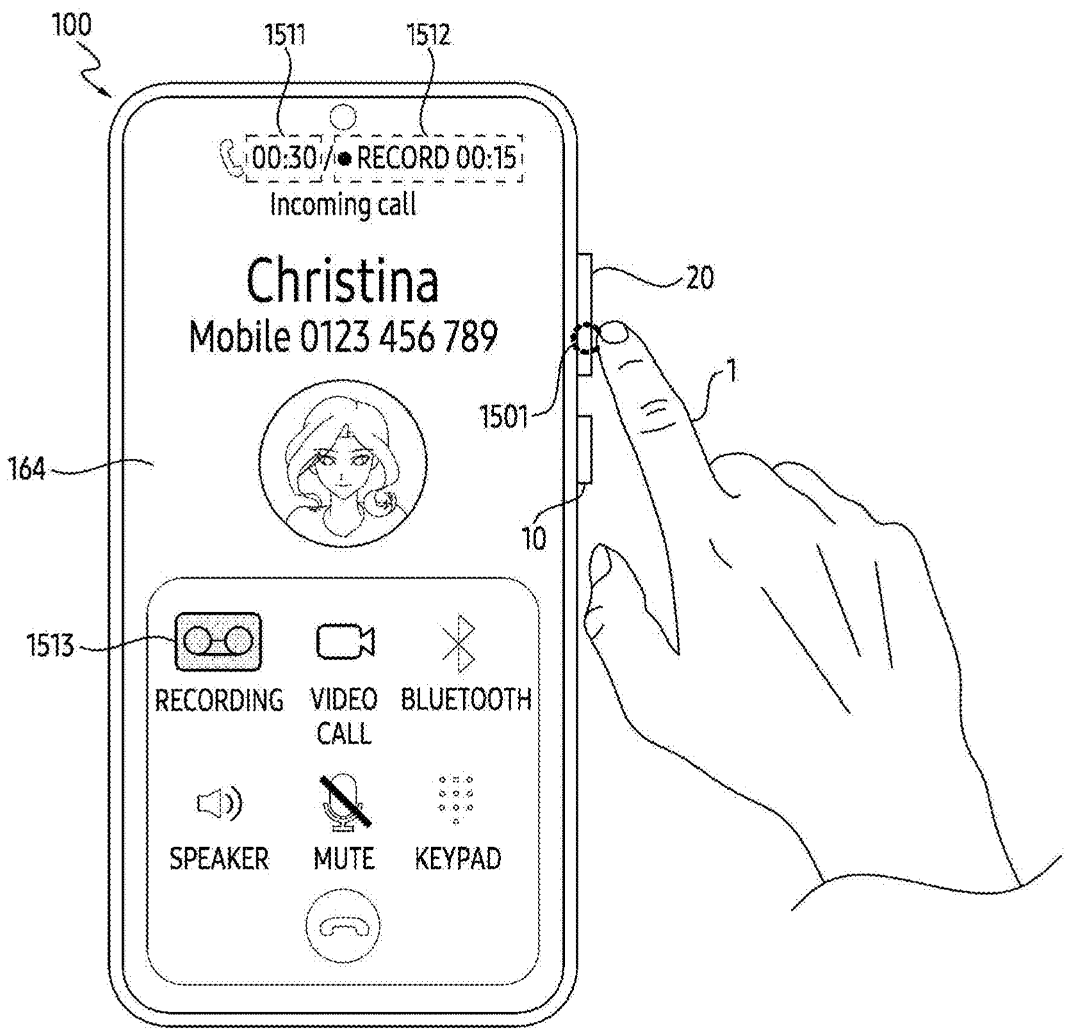
FIG. 15B is a diagram illustrating an example of ceasing recording of a voice call based on a user input, according to various embodiments.

FIGS. 15A and 15B are diagrams illustrating an example of ceasing recording of a voice call based on a user input, according to various embodiments.

Referring to FIG. 15A, an electronic device 100 may display a screen 164 including a visual object 1511 representing duration of a call session of an incoming call, a visual object 1513 indicating whether recording is in progress, and a visual object 1512 indicating a recording time on a display 160. The electronic device 100 may record audio of the call session of the incoming call.

Referring to FIG. 15B, the electronic device 100 may receive a fifth designated touch input 1501 of a user 1. The fifth designated touch input 1501 may include, for example, a hold input (e.g., the hold gesture 706 of FIG. 7) to a first button 10 or a second button 20 (e.g., the first area 22 or the second area 24), but is not limited thereto. For example, the fifth designated touch input 1501 may include various gesture inputs (e.g., the gestures of FIG. 7) on the first button 10 and the first area 22 or the second area 24 of the second button 20.

In an embodiment, the electronic device 100 may halt recording audio only while the fifth designated touch input 1501 is maintained. For example, the electronic device 100 may halt recording audio in response to receiving the fifth designated touch input 1501, and maintain a state in which recording audio is halted while the fifth designated touch input 1501 is maintained. In response to detecting a release of the fifth designated touch input 1501, the electronic device 100 may resume recording audio.

Although not illustrated, the electronic device 100 may cease recording in a case of receiving a sixth designated touch input while maintaining the fifth designated touch input 1501. In a case that the fifth designated touch input 1501 is a hold input to the first button 10 or the second button 20, the sixth designated touch input may be, for example, a press input to the first button 10 or the second button 20.

In an embodiment, the electronic device 100 may provide haptic feedback (e.g., the pattern 803 of FIG. 8A) for informing that recording audio is halted while the fifth designated touch input 1501 is maintained. For example, the haptic feedback may be provided through a button (e.g., the first button 10 or the second button 20) that receives the fifth designated touch input 1501.

The description provided with reference to FIGS. 15A and 15B is not limited to the recording of voice call. For example, the description provided with reference to FIGS. 15A and 15B may also be applied to a method of recording sound around the electronic device 100 using a recorder application. For example, the electronic device 100 may pause recording only while the fifth designated touch input 1501 is maintained during recording through the recorder application. In addition, in a case of receiving the sixth designated touch input while the fifth designated touch input 1501 is maintained, the electronic device 100 may cease recording.

Although not illustrated, the electronic device 100 may mute audio of a microphone 150 or a video of a camera 180 based on a seventh designated touch input during a voice call session or video call session of the incoming call. For example, the electronic device 100 may mute the audio or the video only while the seventh designated touch input is maintained. The seventh designated touch input may include, for example, a hold input to the first button 10 or the second button 20, but is not limited thereto. For example, the seventh designated touch input may include various gesture inputs (e.g., the gestures of FIG. 7) on the first button 10 and the first area 22 or the second area 24 of the second button 20. In addition, while the seventh designated touch input is maintained, the electronic device 100 may provide haptic feedback (e.g., the pattern 803 of FIG. 8A) for informing that audio or video is being muted. The haptic feedback may be provided through a button (e.g., the first button 10 or the second button 20) that received the seventh designated touch input. Through this, it is possible to block the surrounding sound or video to the other party by muting the voice or video of the incoming call while exiting a place where it is difficult to receive a call, such as a conference room.

Figure 16A:
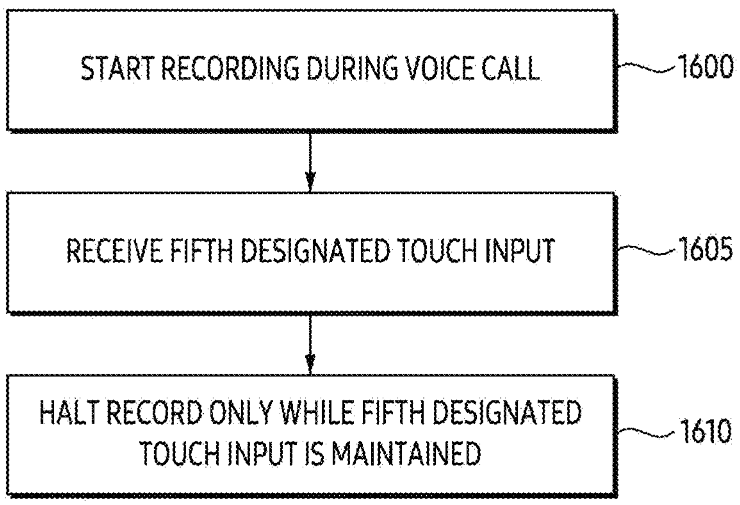
FIG. 16A is a flowchart illustrating an example method of ceasing recording of a voice call based on a user input, according to various embodiments.

FIG. 16A is a flowchart illustrating an example method of ceasing recording of a voice call based on a user input, according to an embodiment. A method of FIG. 16A may be performed by an electronic device 100 of FIG. 6. For example, the method of FIG. 16A may be controlled by a processor 120 of FIG. 6.

Referring to FIG. 16A together with FIGS. 6, 15A, and 15B, in operation 1600, the processor 120 may start recording during a voice call. For example, the processor 120 may record audio of a voice call session of an incoming call.

In operation 1605, the processor 120 may receive a fifth designated touch input. For example, the processor 120 may receive a fifth designated touch input 1501 to a first button 10 or a second button 20. The fifth designated touch input 1501 may include a hold input to the first button 10 or the second button 20, but is not limited thereto. For example, the fifth designated touch input may include various gesture inputs (e.g., the gestures of FIG. 7) on the first button 10 and the first area 22 or the second area 24 of the second button 20.

In operation 1610, the processor 120 may halt recording only while the fifth designated touch input is maintained. For example, the processor 120 may resume the halted recording in response to the fifth designated touch input 1501 being released. The description provided with reference to FIG. 16A may be applied in a manner corresponding to video recording. For example, the processor 120 may record a video of a video call session of the incoming call. The processor 120 may pause recording while the fifth designated touch input 1501 is maintained. The processor 120 may resume the paused recording in response to a release of the fifth designated touch input 1501.

Figure 16B:
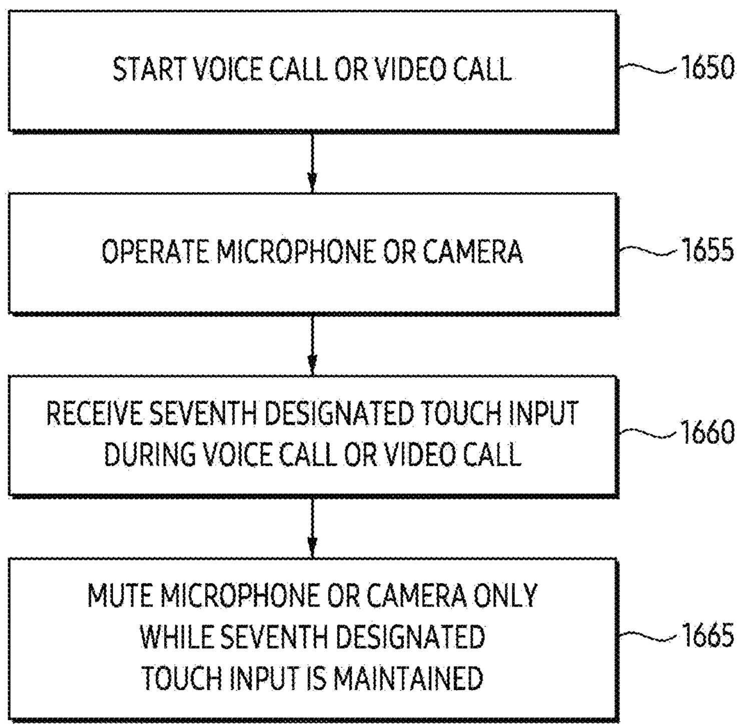
FIG. 16B is a flowchart for an example method of muting audio of a voice call or a video of a video call based on a user input, according to various embodiments.

FIG. 16B is a flowchart for an example method of muting audio of a voice call or a video of a video call based on a user input, according to various embodiments. A method of FIG. 16B may be performed by an electronic device 100 of FIG. 6. For example, the method of FIG. 16B may be controlled by a processor 120 of FIG. 6.

Referring to FIG. 16B together with FIG. 6, in operation 1650, the processor 120 may start a voice call or a video call.

In operation 1655, the processor 120 may operate a microphone 150 or a camera 180. For example, the processor 120 may capture a voice or a video by using the microphone 150 or the camera 180 according to the start of the voice call or the video call.

In operation 1660, processor 120 may receive a seventh designated touch input during the voice call or the video call. For example, the processor 120 may receive a seventh designated touch input to a first button 10 or a second button 20. The seventh designated touch input may include a hold input to the first button 10 or the second button 20.

In operation 1665, the processor 120 may mute the microphone or camera only while the seventh designated touch input is maintained. For example, in a case that the seventh designated touch input is received, the processor 120 may mute the microphone 150 or the camera 180. The processor 120 may maintain a state in which the microphone 150 or the camera 180 is muted, while the seventh designated touch input is maintained. As the seventh designated touch input is released, the processor 120 may release the mute of the microphone 150 or the camera 180.

FIGS. 17A, 17B, 17C, 17D, and 17E are diagrams illustrating an example of controlling playback of media based on a user input, according to various embodiments.

Figure 17A:
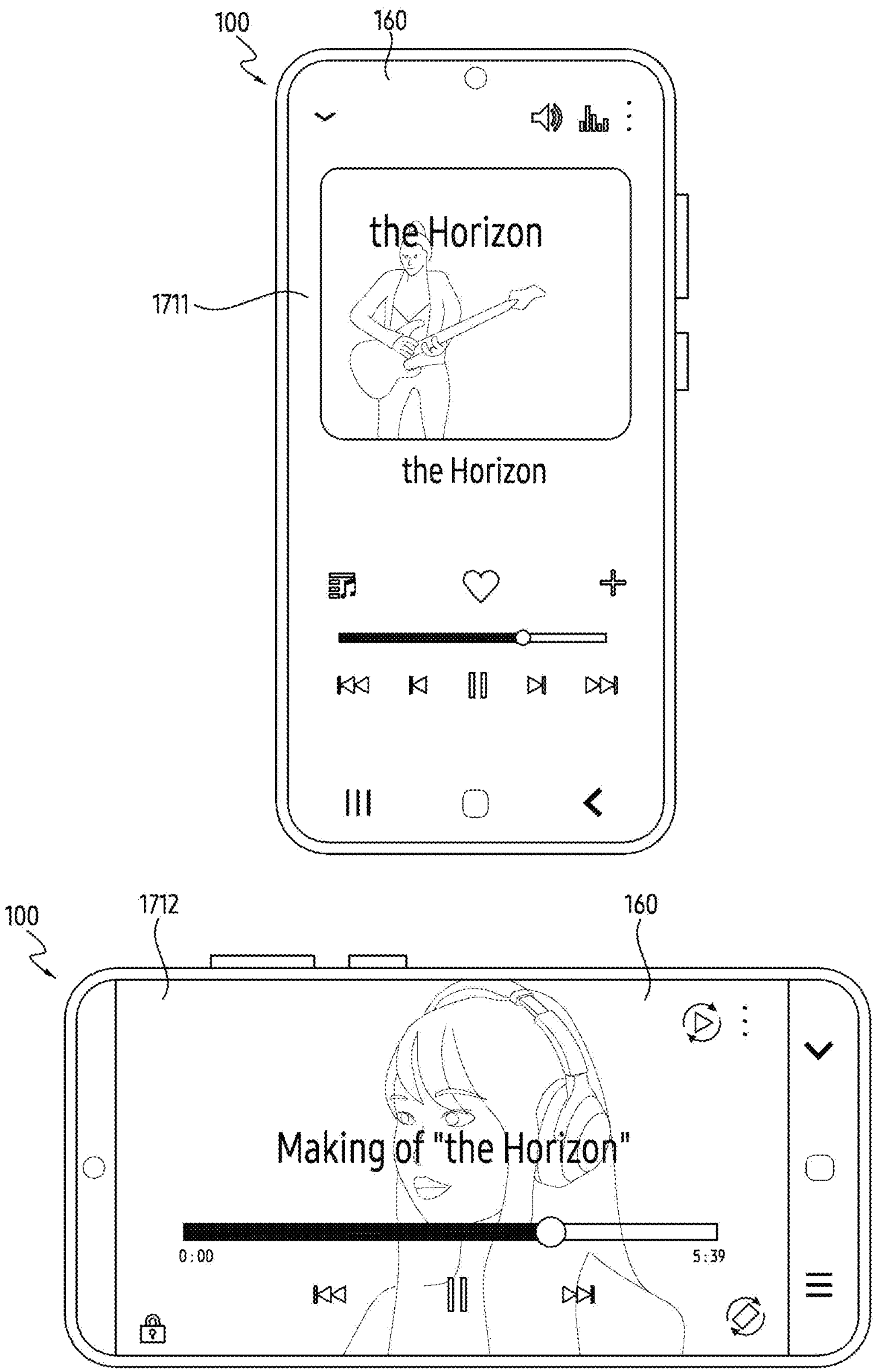
FIG. 17A is a diagram illustrating an example of controlling playback of media based on a user input, according to various embodiments.

Referring to FIG. 17A together with FIG. 6, an electronic device 100 may play media. For example, the electronic device 100 may display an execution screen 1711 of a music application on a display 160. In addition, the electronic device 100 may output sound of media (e.g., music) being played by using a speaker 155. In an embodiment, the electronic device 100 may display an execution screen 1712 of a video application including a playback screen of a video on the display 160. In addition, the electronic device 100 may provide the sound of the video by using the speaker 155.

Figure 17B:
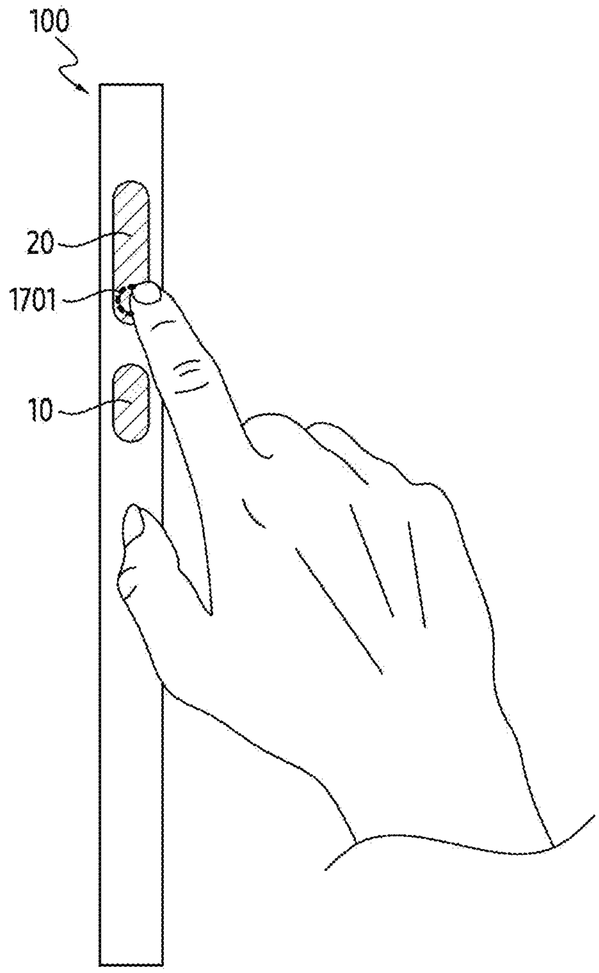
FIG. 17B is a diagram illustrating an example of controlling playback of media based on a user input, according to various embodiments.

Referring to FIG. 17B, the electronic device 100 may receive a first designated touch input 1701 while playing media. The first designated touch input 1701 may include, for example, a tap input (e.g., the tap input 704 of FIG. 7) on a first button 10 or a second button 20, but is not limited thereto. For example, the first designated touch input 1701 may include various gesture inputs (e.g., the gestures of FIG. 7) on the first button 10 and a first area 22 or a second area 24 of the second button 20.

Figure 17C:
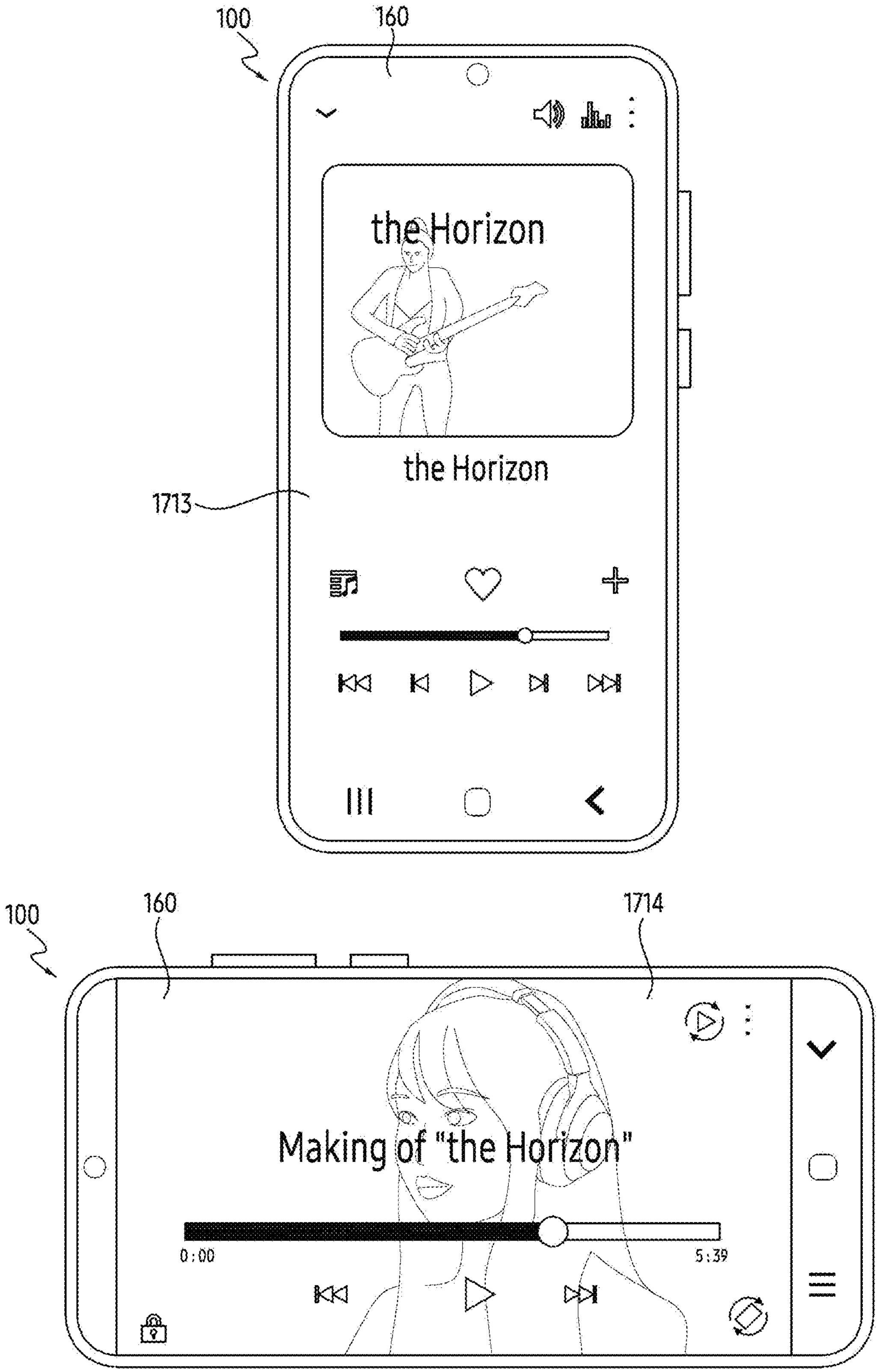
FIG. 17C is a diagram illustrating an example of controlling playback of media based on a user input, according to various embodiments.

Referring to FIG. 17C together with FIG. 6, the electronic device 100 may pause playback of the media in response to receiving the first designated touch input 1701. For example, the electronic device 100 may display an execution screen 1713 of the music application in a state in which media playback is paused on the display 160, and cease outputting sound through the speaker 155. In an embodiment, the electronic device 100 may display an execution screen 1714 of the video application including a still image of the video on the display 160, and cease outputting sound of the video through the speaker 155.

Figure 17D:
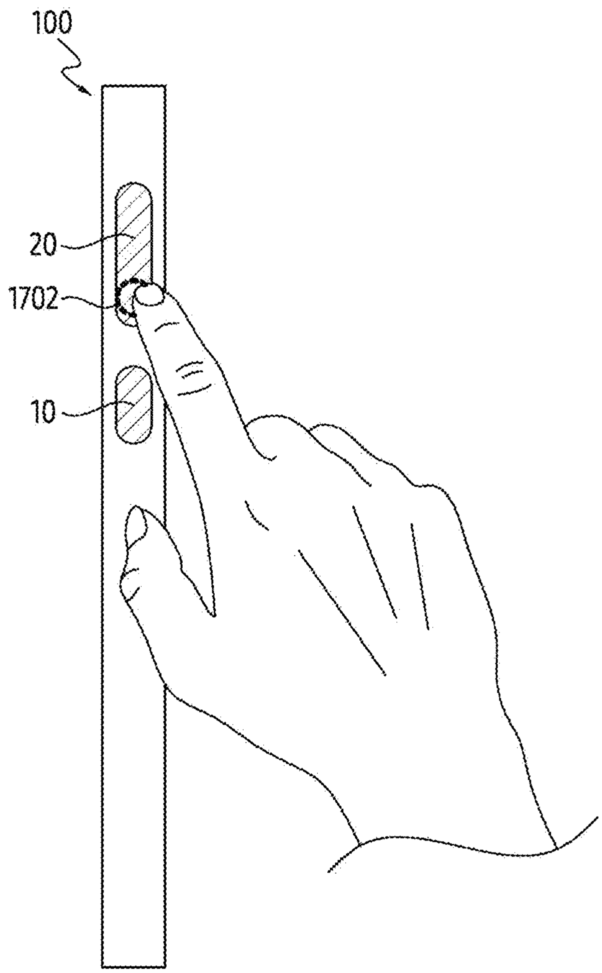
FIG. 17D is a diagram illustrating an example of controlling playback of media based on a user input, according to various embodiments.

Referring to FIG. 17D, the electronic device 100 may receive a second designated touch input 1702 while the media is paused. The second designated touch input 1702 may include, for example, a swipe front gesture (e.g., the swipe front gesture 707 of FIG. 7) on the first button 10 or the second button 20, but is not limited thereto. For example, the second designated touch input 1702 may include various gesture inputs (e.g., the gestures of FIG. 7) on the first button 10 and the first area 22 or the second area 24 of the second button 20.

Figure 17E:
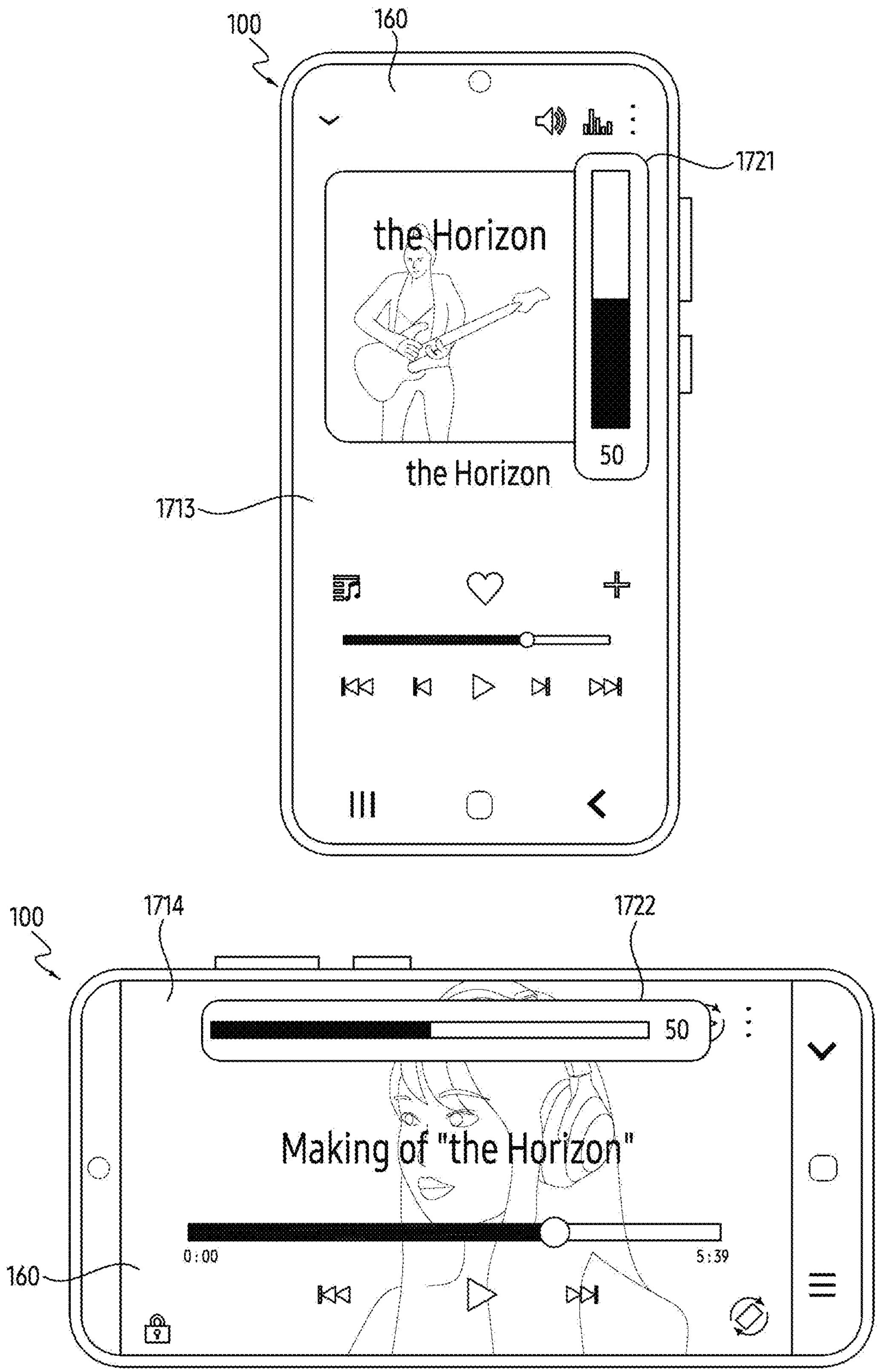
FIG. 17E is a diagram illustrating an example of controlling playback of media based on a user input, according to various embodiments.

Referring to FIG. 17E together with FIG. 6, the electronic device 100 may display a volume indicator on the display 160 in response to receiving the second designated touch input 1702. For example, the electronic device 100 may display a volume indicator 1721 on the display 160, overlapping the execution screen 1713 of the music application. In an embodiment, the electronic device 100 may display a volume indicator 1722 on the display 160, overlapping the execution screen 1714 of the video application.

In an embodiment, the electronic device 100 may adjust volume of the media based on a touch input to the first button 10 or the second button 20 while the volume indicator is displayed. For example, the electronic device 100 may adjust the volume of the speaker 155 in units of a first value based on a third designated touch input received while the volume indicator is displayed. The third designated touch input may include, for example, a swipe up or swipe down gesture to the second button 20, but is not limited thereto. For example, the third designated touch input may include various gesture inputs (e.g., the gestures of FIG. 7) on the first button 10 and the first area 22 or the second area 24 of the second button 20. For example, the third designated touch input may include the swipe up or swipe down gesture to the first button 10. In an embodiment, the electronic device 100 may provide first haptic feedback in response to the third designated touch input. For example, the first haptic feedback (e.g., the pattern 805 of FIG. 8A) may be provided through a button (e.g., the first button 10 and the first area 22 or the second area 24 of the second button 20) on which the third designated touch input is received.

In an embodiment, the electronic device 100 may adjust the volume of the speaker 155 in units of a second value greater than the first value based on a fourth designated touch input received while the volume indicator is displayed. The fourth designated touch input may include, for example, a press input to the first area 22 or the second area 24 of the second button 20, but is not limited thereto. For example, the fourth designated touch input may include various gesture inputs (e.g., the gestures of FIG. 7) on the first button 10 and the first area 22 or the second area 24 of the second button 20. For example, the fourth designated touch input may include a press input on the first button 10 or the second button 20. In an embodiment, the electronic device 100 may provide second haptic feedback (e.g., the pattern 805 of FIG. 8A) in response to the fourth designated touch input. For example, the second haptic feedback may be provided to a button (e.g., the first button 10 and the first area 22 or the second area 24 of the second button 20) on which the fourth designated touch input is received.

In an embodiment, the second haptic feedback may include a vibration pattern different from the first haptic feedback. For example, the second haptic feedback may include a vibration pattern with an amplitude greater than the first haptic feedback to represent that the volume is adjusted to the second value greater than the first value, but is not limited thereto.

Referring to FIG. 17C again, the electronic device 100 may receive a fifth designated touch input in a state in which playback of the media is paused and the volume indicator is not called. The electronic device 100 may adjust a timeline of the media based on the fifth designated touch input. The fifth designated touch input may include, for example, a swipe up or swipe down gesture on the second button 20, but is not limited thereto. For example, the fifth designated touch input may include various gesture inputs (e.g., the gestures of FIG. 7) on the first button 10 and the first area 22 or the second area 24 of the second button 20. In an embodiment, the electronic device 100 may adjust the timeline of the media forward according to the swipe up gesture, and adjust the timeline of the media backward according to the swipe down gesture, but the disclosure is not limited in this respect.

Figure 18:
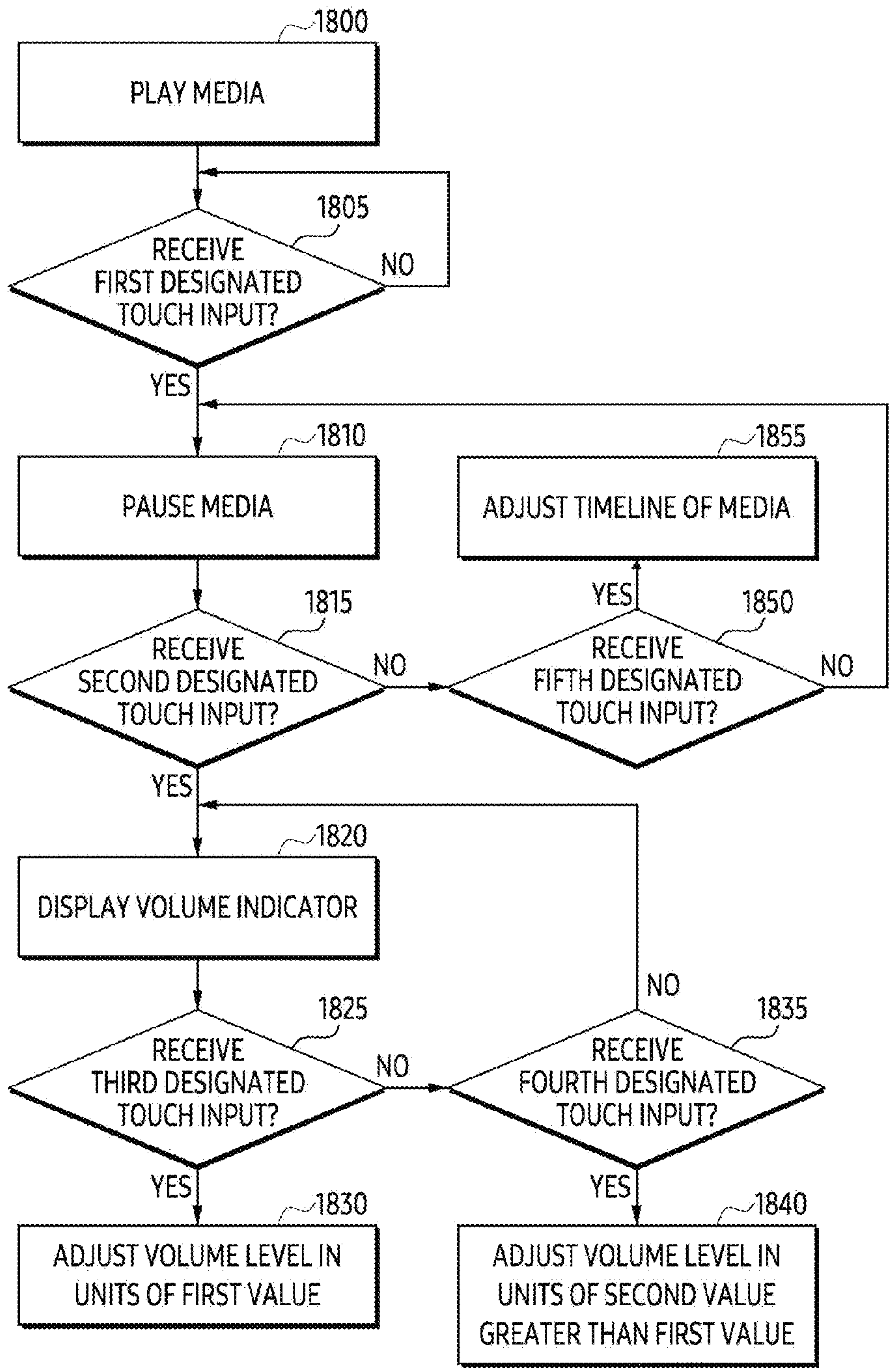
FIG. 18 is a flowchart illustrating an example method of controlling playback of media based on a user touch input, according to various embodiments.

FIG. 18 is a flowchart illustrating an example method of controlling playback of media based on a user touch input, according to various embodiments. A method of FIG. 18 may be performed by an electronic device 100 of FIG. 6. For example, the method of FIG. 18 may be controlled by a processor 120 of FIG. 6. Operations of FIG. 18 may be operations for the description provided with reference to FIGS. 17A, 17B, 17C, 17D, and 17E.

Referring to FIG. 18 together with FIG. 6, in operation 1800, the processor 120 may play media. For example, the processor 120 may play media by using at least one of a display 160 and a speaker 155.

In operation 1805, the processor 120 may receive a first designated touch input. For example, the processor 120 may receive the first designated touch input to a first button 10 or a second button 20 while playing the media. In a case that the first designated touch input is received (operation 1805: Yes), the processor 120 may perform operation 1810. In a case that the first designated touch input is not received (operation 1805: No), the operation 1800 may be performed.

In the operation 1810, the processor 120 may pause playback of the media. For example, the processor 120 may pause playback of the media in response to receiving the first designated touch input.

In operation 1815, the processor 120 may receive a second designated touch input. For example, the processor 120 may receive the second designated touch input to the first button 10 or the second button 20 while playback of the media is paused. In a case that the second designated touch input is received (operation 1815: Yes), the processor 120 may perform operation 1820. In a case that the second designated touch input is not received (operation 1815: No), operation 1850 may be performed.

In the operation 1820, the processor 120 may display a volume indicator. For example, in response to receiving the second designated touch input while playback of the media is paused, the processor 120 may display the volume indicator of a speaker 155 on the display 160 as an overlay on a screen including a first paused image of the media.

In operation 1825, the processor 120 may receive a third designated touch input. For example, the processor 120 may receive the third designated touch input to the first button 10 or the second button 20 while the volume indicator is being displayed. In a case that the third designated touch input is received (operation 1825: Yes), the processor 120 may perform operation 1830. In a case that the third designated touch input is not received (operation 1825: No), operation 1835 may be performed.

In the operation 1830, the processor 120 may adjust volume level in units of a first value. For example, the processor 120 may adjust the volume level of the speaker 155 in units of the first value based on the third designated touch input. Additionally or optionally, the processor 120 may provide first haptic feedback to the first button 10 or the second button 20 in response to the third designated touch input. For example, in a case of receiving the third designated touch input through the first button 10, the processor 120 may control a second haptic actuator 52 to provide the first haptic feedback to the first button 10. For example, in a case of receiving the third designated touch input through the second button 20, the processor 120 may control a third haptic actuator 53 or a fourth haptic actuator 54 to provide the first haptic feedback to the second button 20.

In the operation 1835, the processor 120 may receive a fourth designated touch input. For example, the processor 120 may receive the fourth designated touch input to the first button 10 or the second button 20 while the volume indicator is being displayed. In a case that the fourth designated touch input is received (operation 1835: Yes), the processor 120 may perform operation 1840. In a case that the fourth designated touch input is not received (operation 1835: No), the processor 120 may perform the operation 1820. For example, the processor 120 may maintain a state in which the volume indicator is displayed.

In the operation 1840, the processor 120 may adjust the volume level in units of a second value greater than the first value. For example, the processor 120 may adjust the volume level of the speaker 155 in units of the second value greater than the first value based on the fourth designated touch input. Additionally or optionally, the processor 120 may provide second haptic feedback to the first button 10 or the second button 20 in response to the fourth designated touch input. For example, in a case of receiving the fourth designated touch input through the first button 10, the processor 120 may control the second haptic actuator 52 to provide the second haptic feedback to the first button 10. For example, in a case of receiving the fourth designated touch input through the second button 20, the processor 120 may control the third haptic actuator 53 or the fourth haptic actuator 54 to provide the second haptic feedback to the second button 20.

In the operation 1850, the processor 120 may receive a fifth designated touch input. For example, the processor 120 may receive the fifth designated touch input to the first button 10 or the second button 20 while the volume indicator is not displayed on the display 160. In a case that the fifth designated touch input is received (operation 1850: Yes), the processor 120 may perform operation 1855. In a case that the fifth designated touch input is not received (operation 1850: No), the processor 120 may maintain the operation 1810, for example, a media pause state.

In the operation 1855, the processor 120 may adjust the timeline of the media. For example, the processor 120 may adjust the timeline of the media based on the fifth designated touch input.

An electronic device (e.g., the electronic device 100 of FIG. 1) according to an embodiment may include a housing (e.g., the housing 110 of FIG. 6) including a button (e.g., the first button 10 or the second button 20 of FIG. 6), a first haptic actuator (e.g., the first haptic actuator 51 of FIG. 6) in the housing spaced apart from the button, a second haptic actuator (e.g., the second haptic actuator 52 or the third haptic actuator 53 of FIG. 6) providing haptic feedback through the button by being connected to the button, at least one sensor configured to detect a touch input on the button by a user, and at least one processor (e.g., the processor 120 of FIG. 6). The at least one processor may be operably coupled to the first haptic actuator, the second haptic actuator, and the at least one sensor. The at least one processor may control the first haptic actuator to output first haptic feedback (e.g., the notification 91 of FIG. 9A) associated with a designated event. The at least one processor may control the first haptic actuator to cease outputting the first haptic feedback in response to detecting a designated touch input by the at least one sensor while outputting the first haptic feedback. The at least one processor may control the second haptic actuator to output second haptic feedback (e.g., the second haptic feedback 92 of FIG. 9C) in response to detecting a designated touch input by the at least one sensor while outputting the first haptic feedback.

In an embodiment, an electronic device may include a speaker (e.g., the speaker 155 of FIG. 1). The at least one processor may switch a state of the electronic device from a first state or a second state to a third state in response to detecting the designated touch input by the at least one sensor while outputting the first haptic feedback. The first state may be a state in which both the speaker and the first haptic actuator are activated. The second state may be a state in which the speaker is deactivated, and the first haptic actuator is activated. The third state may be a state in which both the speaker and the first haptic actuator are deactivated.

In an embodiment, the button may be a first button (e.g., the first button 10 of FIG. 6), the at least one sensor may be at least one first sensor, the designated touch input may be a first designated touch input, and the designated event may include an incoming call. The housing may include a second button (e.g., the second button 20 of FIG. 6). The electronic device may include at least one second sensor configured to detect a touch input of a user to the second button and a third haptic actuator (e.g., the third actuator 53 of FIG. 6) providing haptic feedback through the second button by being connected to the second button. The at least one processor operably coupled to the third haptic actuator and the at least one second sensor may receive a second touch input to the first button or the second button using the at least one first sensor or the at least one second sensor. The at least one processor may process the event based on the received second touch input.

In an embodiment, the at least one processor may accept the incoming call in response to identifying that the received second touch input matches a second designated touch input. The at least one processor may reject the incoming call in response to identifying that the received second touch input matches a third designated touch input.

In an embodiment, the first designated touch input may include a tap input on the first button, the second designated touch input may include a press input on the second button that exceeds a threshold pressure value, and the third designated touch input may include a press input on the first button that exceeds the threshold pressure value.

In an embodiment, the second button may include a first area (e.g., the first area 22 of FIG. 6) and a second area (e.g., the second area 24 of FIG. 6). The first area may be located between the first button and the second area, and the second designated touch input may include a press input to the second area from among the first area and the second area.

In an embodiment, the electronic device may include a fourth haptic actuator (e.g., the fourth actuator 54 of FIG. 6) connected to the second area from among the first area and the second area. The third haptic actuator may be connected to the first area from among the first area and the second area.

In an embodiment, the at least one processor may control the fourth haptic actuator to output third haptic feedback in response to accepting the incoming call. The at least one processor may control the second haptic actuator to output fourth haptic feedback in response to rejecting the incoming call.

In an embodiment, the electronic device may comprise a microphone (e.g., the microphone 150 of FIG. 1). The designated event may include an incoming call. The at least one processor operably coupled to the microphone may receive a fourth touch input on the first button during a voice call session of the incoming call. The at least one processor may mute audio of the microphone only while the received fourth designated touch input is sustained.

In an embodiment, the fourth designated touch input may be a hold input in which contact to the first button is maintained for more than a designated time.

In an embodiment, the electronic device may comprise a camera (e.g., the camera 180 of FIG. 1). The designated event may include an incoming call. The at least one processor operably coupled to the camera may receive a fifth designated touch input to the first button during a video call session of the incoming call. The at least one processor may mute video of the camera only while the received fifth designated touch input is maintained.

In an embodiment, the fifth designated touch input may include a hold input in which contact to the first button is maintained for more than a designated time.

In an embodiment, the at least one processor may record audio of the voice call session. The at least one processor may receive a sixth designated touch input to the first button while recording the audio of the voice call session. The at least one processor may halt recording the audio only while the received sixth designated touch input is maintained.

In an embodiment, the at least one processor may cease recording the audio in response to receiving a seventh designated touch input to the first button.

In an embodiment, the sixth designated touch input may include a hold input in which contact to the first button is maintained for more than a designated time. The seventh designated touch input may include a press input on the first button that exceeds the threshold pressure value.

In an embodiment, the designated event may be an event triggered by a user other than the user of the electronic device 100. The at least one processor may control the second haptic actuator to output fifth haptic feedback in response to identifying that an identification (ID) of a sender of the designated event matches at least one entry of a database of contacts.

In an embodiment, the at least one processor may control the second haptic actuator to output the fifth haptic feedback based on designated pattern information of the database of the contacts associated with the ID of the sender.

In an embodiment, the fifth haptic feedback may include a vibration pattern different from the first haptic feedback.

In an embodiment, the electronic device may include a display (e.g., the display 160 of FIG. 1). The at least one processor operably coupled to the display may display a screen including a notification associated with the designated event at a first brightness level on the display. The at least one processor may display the screen on the display at a second brightness level less than the first brightness level in response to detecting the designated touch input by the at least one sensor while the first haptic feedback is outputted.

In an embodiment, the electronic device may include a display. The at least one processor operably coupled to the display may display a screen including a notification associated with the designated event at the first brightness level on the display. The at least one processor may display a selection menu (e.g., the selection menu 1301 of FIG. 13B) on the display as an overlay on the screen in response to detecting an eighth designated touch input by the at least one sensor while the screen is displayed.

In an embodiment, the designated event may include an incoming call. The selection menu may include a quick message list. The at least one processor may receive a ninth designated touch input using the at least one sensor while displaying the selection menu. The at least one processor may transmit a message corresponding to one item selected from the quick message list to the sender of the incoming call in response to receiving the ninth touch input.

In an embodiment, the eighth designated touch input may include a swipe up gesture input to the first button. The ninth designated touch input may include a press input to the first button that exceeds the threshold pressure value.

In an embodiment, an electronic device (e.g., the electronic device 100 of FIG. 1) may include a housing (e.g., the housing 110 of FIG. 6) including a first button (e.g., the first button 10 of FIG. 6) and a second button (e.g., the second button 20 of FIG. 6), a display (e.g., the display 160 of FIG. 1), a speaker (e.g., the speaker 155 of FIG. 1), a first haptic actuator (e.g., the second haptic actuator 52 of FIG. 6) providing haptic feedback through the first button by being connected to the first button, a second haptic actuator (e.g., the third haptic actuator 53 of FIG. 6) providing haptic feedback through a first area (e.g., the first area 22 of FIG. 6) of the second button by being connected to the second button, a third haptic actuator (e.g., the fourth haptic actuator 54 of FIG. 6) providing haptic feedback through a second area (e.g., the second area 24 of FIG. 6) of the second button by being connected to the second button, at least one first sensor configured to detect a touch input on the first button by a user, at least one second sensor configured to detect a touch input on the first area and the second area of the second button by the user, and at least one processor (e.g., the processor 120 of FIG. 1). The at least one processor may be operably coupled to the display, the speaker, the first haptic actuator, the second haptic actuator, the third haptic actuator, the at least one first sensor, and the at least one second sensor. The at least one processor may be configured to play media using at least one among the display and the speaker. The at least one processor may be configured to pause playback of the media in response to receiving a first designated touch input to the first button during playback of the media. The at least one processor may be configured to display a volume indicator (e.g., the volume indicators 1721 and 1722 of FIG. 17E) of the speaker 155 on the display as an overlay on a screen including a first paused image of the media in response to receiving a second designated touch input to the first button while playback of the media is paused. The at least one processor may be configured to receive a third designated touch input to the first button while the volume indicator is displayed on the display. The at least one processor may be configured to adjust a volume level of the speaker in units of a first value based on the third designated touch input. The at least one processor may be configured to receive a fourth designated touch input to the first area or the second area of the second button while the volume indicator is displayed on the display. The at least one processor may be configured to adjust the volume level of the speaker in units of a second value greater than the first value based on the fourth designated touch input.

In an embodiment, the at least one processor may be configured to receive a fifth designated touch input to the first button while the volume indicator is not displayed on the display. The at least one processor may be configured to adjust a timeline of the media based on the fifth designated touch input.

In an embodiment, the at least one processor may be configured to control the first haptic actuator to output first haptic feedback in response to adjusting the volume level of the speaker in units of the first value. The at least one processor may be configured to control the second haptic actuator or the third haptic actuator to output second haptic feedback different from the first haptic feedback in response to adjusting the volume level of the speaker in units of the second value.

In an embodiment, the first designated touch input may include a tap input, the second designated touch input may include a swipe front gesture input, the third designated touch input may include a swipe up gesture or a swipe down gesture, the fourth designated touch input may include a press input that exceeds the threshold pressure value, and the fifth designated touch input may include a swipe up gesture input or a swipe down gesture input.

In an embodiment, an electronic device (e.g., the electronic device 100 of FIG. 1) may include a housing (e.g., the housing 110 of FIG. 6), a display (e.g., the display 160 of FIG. 2) disposed in the housing, communication circuitry (e.g., the wireless communication circuit 192 of FIG. 1), a first actuator (e.g., the first haptic actuator 51 of FIG. 6) configured to provide vibration feedback in response to receiving an incoming call event through the communication circuitry, a sensor (e.g., the sensor 176 of FIG. 1) configured to receive a user touch input with respect to a side surface (e.g., the side surface 100C of FIG. 3) of the housing, a second actuator (e.g., the second haptic actuator 52 of FIG. 6) configured to provide vibration feedback in response to receiving the user touch input through the sensor; and at least one processor (e.g., the processor 120 of FIG. 6). The at least one processor may be configured to control the first actuator to provide first vibration feedback in response to the incoming call event. The at least one processor may be configured to receive, from the sensor, a designated user touch input with respect to the side surface of the housing while providing the first vibration feedback by the first actuator. The at least one processor may be configured to control the first actuator to cease providing the first vibration feedback and control the second actuator to provide second vibration feedback such that the second vibration feedback is provided through a finger corresponding to the designated user touch input with respect to the side surface of the housing, in response to receiving the designated user touch input.

In an embodiment, the at least one processor may be configured to control the second actuator to provide the second vibration feedback while the touch input is maintained on the side surface of the housing.

In an embodiment, the electronic device may include a speaker (e.g., the speaker 155 of FIG. 6). The at least one processor may be configured to provide, through the speaker, a ringtone for the incoming call event. The at least one processor may be configured to transit a state of the electronic device from a first state or a second state to a third state, in response to the designated user touch input. The first state may be a state in which both the speaker and the first actuator are activated. The second state may be a state in which the speaker is deactivated, and the first actuator is activated. The third state may be a state in which both the speaker and the first actuator are deactivated.

In an embodiment, the designated user touch input may be a first designated user touch input. The sensor may be a first sensor configured to receive a user touch input with respect to an area of the side surface of the housing. The electronic device may include a second sensor configured to receive a user touch input with respect to another area of the side surface of the housing, and a third actuator (e.g., the third haptic actuator 53 of FIG. 6) configured to provide vibration feedback in response to receiving the user touch input through the second sensor. The at least one processor may be configured to receive, from the second sensor, a second designated user touch input with respect to the other area of the side surface of the housing. The at least one processor may be configured to reject the incoming call event, in response to the second designated user touch input. The at least one processor may be configured to receive, by the first sensor, a third designated user touch input with respect to the area of the side surface of the housing. The at least one processor may be configured to accept the incoming call event, in response to the third designated user touch input.

In an embodiment, the first sensor may be configured to detect a pressure of a touch input on the area of the side surface. The second sensor may be configured to detect a pressure of a touch input on the other area of the side surface. The first designated user touch input may include a touch input on the area of the side surface below a threshold pressure value. The second designated user touch input may include a touch input on the other area of the side surface exceeding the threshold pressure value. The third designated user touch input may include a touch input on the area of the side surface exceeding the threshold pressure value.

In an embodiment, the at least one processor may be configured to control the third actuator to provide third vibration feedback informing that the incoming call event is rejected, in response to the second designated user touch input. The third vibration feedback may be provided to the finger contacted on the other area of the side surface. The at least one processor may be configured to control the second actuator to provide fourth vibration feedback informing that the incoming call event is accepted, in response to the third designated user touch input. The fourth vibration feedback may be provided to the finger contacted on the area of the side surface.

In an embodiment, the electronic device may include a microphone (e.g., the microphone 150 of FIG. 1). The at least one processor may be configured to receive a fourth designated user touch input on the area or the other area of the side surface, during a voice call session of the incoming call event. The at least one processor may be configured to mute audio of the microphone and control the first actuator or the second actuator to provide fifth vibration feedback such that the fifth vibration feedback is provided through the area or the other area where the fourth designated user touch input is received, while the fourth designated user touch input is maintained on the area or the other area of the side surface. The at least one processor may be configured to unmute the audio of the microphone, in response to a release of the fourth designated user touch input.

In an embodiment, the at least one processor may be configured to record audio of the voice call session. The at least one processor may be configured to receive a fifth designated user touch input with respect to the area or the other area of the side surface, while the recording of the audio. The at least one processor may be configured to pause the recording of the audio, and control the first actuator or the second actuator to provide sixth vibration feedback such that the sixth vibration feedback is provided through the area or the other area where the fifth designated user touch input is received, while the fifth designated user touch input is maintained. The at least one processor may be configured to resume the recording of the audio, in response to a release of the fifth designated user touch input.

In an embodiment, the electronic device may include a camera (e.g., the camera 180 of FIG. 1). The at least one processor may be configured to receive a sixth designated user touch input on the area or the other area of the side surface, during a video call session of the incoming call event. The at least one processor may be configured to mute video of the camera, and control the first actuator or the second actuator to provide seventh vibration feedback such that the seventh vibration feedback is provided through the area or the other area where the sixth designated user touch input is received, while the sixth designated user touch input is maintained on the area or the other area of the side surface. The at least one processor may be configured to unmute the video of the camera, in response to a release of the sixth designated user touch input.

In an embodiment, the at least one processor may be configured to record a video of the video call session. The at least one processor may be configured to receive the seventh designated user touch input with respect to the area or the other area of the side surface, while recording the video. The at least one processor may be configured to pause the recording of the video, in response to the seventh designated user touch input. The at least one processor may be configured to pause the recording of the video, and control the first actuator or the second actuator to provide eighth vibration feedback such that the eighth vibration feedback is provided through the area or the other area of the side surface where the seventh designated user touch input is received, while the seventh designated user touch input is maintained. The at least one processor may be configured to resume the recording of the video, in response to a release of the seventh designated user touch input.

In an embodiment, the at least one processor may be configured to identify whether an identification (ID) of a sender of the incoming call event matches at least one entry of a database of contacts. The at least one processor may be configured to determine preset vibration pattern in the database of the contacts associated with the ID of the sender, in response to identifying that the ID of the sender matches the at least one entry of the database of the contacts. The at least one processor may be configured to control the second actuator to provide the second vibration feedback based on the preset vibration pattern.

In an embodiment, the at least one processor may be configured to control the display to provide a screen including a notification of the incoming call event at a first brightness level. The at least one processor may be configured to control the display to provide the screen at a second brightness level less than the first brightness level, in response to the designated user touch input. The at least one processor may be configured to control the display to provide a selection menu including a quick message list as an overlay on the screen, in response to detecting a fifth designated user touch input on the area of the side surface while providing of the screen.

In an embodiment, an electronic device (e.g., the electronic device 100 of FIG. 1) may include a housing (e.g., the housing 110 of FIG. 3) forming a side surface of the electronic device, and including a first button (e.g., the first button 10 of FIG. 6) and a second button (e.g., the second button 20 of FIG. 6) located on the side surface, a first sensor (e.g., the sensor 176 of FIG. 1) configured to receive a touch input of a user to the first button, a second sensor (e.g., the sensor 176 of FIG. 1) configured to receive a touch input of the user to the second button, a display (e.g., the display 160 of FIG. 1), a first actuator (e.g., the second haptic actuator 52 of FIG. 6) coupled to the first button and configured to provide vibration feedback in response to receiving a touch input to the first button, a second actuator (e.g., the third haptic actuator 53 of FIG. 6) coupled to the second button and configured to provide vibration feedback in response to receiving a touch input to the second button, and at least one processor (e.g., the processor 120 of FIG. 1). The at least one processor may be configured to cause the display to provide a playback screen of media. The at least one processor may be configured to receive a first touch input to the first button by the first sensor, while the playback screen of the media is provided. The at least one processor may be configured to cause the display to provide a pause screen of the media, in response to the first touch input. The at least one processor may be configured to receive a second touch input to the first button from the first sensor, while the pause screen is provided. The at least one processor may be configured to cause the display to display a volume indicator of the media as an overlay on the pause screen, in response to the second touch input. The at least one processor may be configured to receive a third touch input to the first button by the first sensor, while the volume indicator is displayed. The at least one processor may be configured to adjust a volume of the media in units of a first value, and cause the first actuator to provide first vibration feedback through the first button in contact with a finger of the user, in response to the third touch input. The at least one processor may be configured to receive a fourth touch input to the second button by the second sensor, while the volume indicator is displayed. The at least one processor may be configured to adjust the volume of the media in units of a second value greater than the first value, and cause the second actuator to provide second vibration feedback through the second button in contact with a finger of the user, in response to the fourth touch input.

In an embodiment, the at least one processor may be configured to receive a fifth touch input to the second button from the second sensor, while the pause screen is provided. The at least one processor may be configured to adjust a timeline of the media, in response to the fifth touch input.

In an embodiment, the electronic device may comprise a third actuator (e.g., the fourth haptic actuator 54 of FIG. 6). The second button may include a first area and a second area. The second sensor may be configured to receive a touch input of the user to the first area and the second area. The second actuator may be connected to the first area and configured to provide the vibration feedback in response to receiving the touch input to the first area. The third actuator may be connected to the second area and configured to provide vibration feedback in response to receiving the touch input of the user to the second area. The fourth touch input may be an input to the first area. The at least one processor may be configured to increase the volume in units of the second value, and cause the second actuator to provide the second vibration feedback through the first area of the second button in contact with a finger of the user, in response to receiving the fourth touch input to the first area. The at least one processor may be configured to receive a fifth touch input to the second area by the second sensor, while the volume indicator is displayed. The at least one processor may be configured to decrease the volume in units of the second value, and cause the third actuator to provide third vibration feedback through the second area of the second button in contact with a finger of the user, in response to receiving the fifth touch input to the second area.

In an embodiment, an electronic device (e.g., the electronic device 100 of FIG. 1) may include a housing (e.g., the housing 100 of FIG. 2), a button (e.g., the first button 10 of FIG. 6) partially forming a side surface (e.g., the side surface 100C of FIG. 2) of the housing, a first actuator (e.g., the first haptic actuator 51 of FIG. 6) disposed spaced apart from the button, a second actuator (e.g., the second haptic actuator 52 of FIG. 6) in contact with the button, a sensor (e.g., the sensor 176 of FIG. 1) arranged with respect to the button, and at least one processor (e.g., the processor 120 of FIG. 1). The at least one processor may be configured to detect an event. The at least one processor may be configured to cause the first actuator from among the first actuator and the second actuator to provide first vibration feedback to inform the event, in response to the event. The at least one processor may be configured to receive, through the sensor, a touch input from an input portion contacted on the button, while the first vibration feedback is provided. The touch input may be received to cease providing the first vibration feedback. The at least one processor may be configured to cause the first actuator to cease providing the first vibration feedback and cause the second actuator in contact with the button from among the first actuator and the second actuator to provide second vibration feedback to inform that the touch input is processed, in response to the touch input. The second vibration feedback may be provided to the input portion contacted on the button.

In an embodiment, the processor may be configured to cause the second actuator to provide the second vibration feedback while the touch input is maintained on the button.

In an embodiment, the electronic device may include a speaker (e.g., the speaker 155 of FIG. 1). The at least one processor may be configured to cause the speaker to provide a ringtone to inform the event, in response to the event. The at least one processor may be configured to transit a state of the electronic device from a first state or a second state to a third state, in response to the touch input. The first state may be a state in which both the speaker and the first actuator are activated. The second state may be a state in which the speaker is deactivated, and the first actuator is activated. The third state may be a state in which both the speaker and the first actuator are deactivated.

In an embodiment, the touch input may be a first touch input. The button may be a first button. The sensor may be a first sensor. The event may include an incoming call. The housing may include a second button (e.g., the second button 20 of FIG. 6). The electronic device may comprise a third actuator (e.g., the third haptic actuator 53 of FIG. 6) in contact with the second button, and a second sensor (e.g., the sensor 176 of FIG. 1) arranged with respect to the second button. The at least one processor may be configured to receive, through the second sensor, a second touch input from the input portion in contact with the second button. The at least one processor may be configured to reject the incoming call, in response to the second touch input. The at least one processor may be configured to receive, through the first sensor, a third touch input from the input portion in contact with the first button. The at least one processor may be configured to accept the incoming call, in response to the third touch input.

In an embodiment, the first sensor may be configured to detect a pressure of a touch input on the first button. The second sensor may be configured to detect a pressure of a touch input on the second button. The second touch input may include a touch input on the second button exceeding a threshold pressure value. The third touch input may include a touch input on the first button exceeding a threshold pressure value.

In an embodiment, the at least one processor may be configured to cause the third actuator to provide third vibration feedback to inform that the incoming call is rejected, in response to the second touch input. The third vibration feedback may be provided to the input portion contacted on the second button. The at least one processor may be configured to cause the second actuator to provide fourth vibration feedback to inform that the incoming call is accepted, in response to the third touch input. The fourth vibration feedback may be provided to the input portion contacted on the first button.

In an embodiment, the electronic device may include a microphone (e.g., the microphone 150 of FIG. 1). The at least one processor may be configured to receive a fourth touch input on the first button or the second button, during a voice call session of the incoming call. The at least one processor may be configured to mute audio of the microphone only while the fourth touch input is maintained on the first button or the second button.

In an embodiment, the electronic device may include a camera (e.g., the camera 180 of FIG. 1). The at least one processor may be configured to receive a fifth touch input on the first button or the second button, during a video call session of the incoming call. The at least one processor may be configured to mute video of the camera only while the fifth touch input is maintained on the first button or the second button.

In an embodiment, the event may be an event triggered by a user other than the user of the electronic device. The at least one processor may be configured to identify whether an ID of a sender of the event matches at least one entry of a database of contacts. The at least one processor may be configured to cause the second actuator to provide the second vibration feedback based on preset vibration pattern in the database of the contacts associated with the ID of the sender, in response to identifying that the ID of the sender matches the at least one entry of the database of the contacts.

In an embodiment, the electronic device may include a display (e.g., the display 160 of FIG. 1). The at least one processor may be configured to cause the display to provide a screen including a notification of the event at a first brightness level. The at least one processor may be configured to cause the display to provide the screen at a second brightness level less than the first brightness level, in response to the touch input. The at least one processor may be configured to cause the display to provide a selection menu including a quick message list as an overlay on the screen, in response to detecting a sixth touch input on the first button while providing of the screen.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., the memory 130) that is readable by a machine (e.g., the electronic device 100). For example, a processor (e.g., the processor 120) of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
- a housing including a touch input portion defining a portion of a side surface of the electronic device;
- a display;
- a speaker;
- communication circuitry;
- a first actuator configured to provide vibration feedback through a body of the housing to which the first actuator is coupled;
- a second actuator configured to provide vibration feedback through the touch input portion to which the second actuator is coupled;
- at least one processor including processing circuitry; and
- memory including storing instructions,
- wherein the instructions, when executed by the at least one processor individually or collectively, cause the electronic device to:
  - receive an incoming call via the communication circuitry;
  - in response to receiving the incoming call:
    - provide a ringtone based on a state of the electronic device set to a first state in which the speaker is activated while the first actuator is deactivated; or
    - provide first vibration feedback to the body of the housing via the first actuator based on the state of the electronic device set to a second state in which the speaker is deactivated and the first actuator is activated;
- identify a user touch input to the touch input portion while receiving the incoming call; and
- based on identifying the user touch input,
- transition the state of the electronic device from the first state or the second state to a third state for providing second vibration feedback to the touch input portion using the second actuator,
- wherein the third state is:
  - a state in which the speaker is deactivated from the first state; and
  - a state in which the first actuator is deactivated from the second state.

2. The electronic device of claim 1,
- wherein the instructions, when executed by the at least one processor individually or collectively, cause the electronic device to provide the second vibration feedback via the second actuator while the user touch input is maintained on the touch input portion.

3. The electronic device of claim 1, comprising:
- another touch input portion defining another portion of the side surface of the electronic device; and
- a third actuator configured to provide third vibration feedback through the another touch input portion to which the third actuator is coupled,
- wherein the touch input is a first touch input,
- wherein the instructions, when executed by the at least one processor individually or collectively, cause the electronic device to:
  - based on identifying a second touch input to the another touch input portion while the first vibration feedback is provided, reject the incoming call; and
  - based on identifying a third touch input to the touch input portion while the first vibration feedback is provided, accept the incoming call.

4. The electronic device of claim 3, wherein the instructions, when executed by the at least one processor individually or collectively, cause the electronic device to:
- in response to the second touch input, provide the third vibration feedback via the third actuator to inform that the incoming call is rejected; and
- in response to the third touch input, provide vibration feedback via the second actuator to inform that the incoming call is accepted.

5. The electronic device of claim 3, comprising a microphone,
- wherein the instructions, when executed by the at least one processor individually or collectively, cause the electronic device to:
  - during a voice call session of the incoming call, receive a fourth touch input to the touch input portion or the another touch input portion;
  - while the fourth touch input is maintained on the touch input portion or the another touch input portion, mute audio of the microphone and provide vibration feedback via at least one of the first, second, or third actuators; and
  - in response to a release of the fourth touch input, unmute the audio of the microphone.

6. The electronic device of claim 5, wherein the instructions, when executed by the at least one processor individually or collectively, cause the electronic device to:
record audio of the voice call session;
while recording the audio,
receive a fifth touch input to the touch input portion or the another touch input portion;
while the fifth touch input is maintained, pause the recording of the audio, and provide vibration feedback via at least one of the first, second, or third actuators; and
in response to a release of the fifth touch input, resume the recording of the audio.

7. The electronic device of claim 3, comprising a camera, and wherein the instructions, when executed by the at least one processor individually or collectively, cause the electronic device to:
during a video call session of the incoming call, receive a sixth touch input on the touch input portion or the another touch input portion;
while the sixth touch input is maintained on the touch input portion or the another touch input portion, mute video of the camera, and provide vibration feedback via at least one of the first, second, or third actuators; and
in response to a release of the sixth touch input, unmute the video of the camera.

8. The electronic device of claim 7, wherein the instructions, when executed by the at least one processor individually or collectively, cause the electronic device to:
record a video of the video call session;
while recording the video, receive a seventh touch input to the touch input portion or the another touch input portion;
in response to the seventh touch input, pause the recording of the video;
while the seventh touch input is maintained, pause the recording of the video, and provide vibration feedback via at least one of the first, second, or third actuators; and
in response to a release of the seventh touch input, resume the recording of the video.

9. The electronic device of claim 1,
wherein the instructions, when executed by the at least one processor individually or collectively, cause the electronic device to:
identify whether an identification (ID) of a sender of the incoming call matches at least one entry of a database of contacts;
in response to identifying that the ID of the sender matches at least one entry of the database of the contacts, determine preset vibration pattern in the database of the contacts associated with the ID of the sender; and
provide the second vibration feedback via the second actuator based on the preset vibration pattern.

10. The electronic device of claim 1, wherein the instructions, when executed by the at least one processor individually or collectively, cause the electronic device to:
provide, via the display, a screen including a notification of the incoming call at a first brightness level;
in response to the touch input, provide, via the display, the screen at a second brightness level less than the first brightness level; and
in response to detecting another touch input to the touch input portion while providing of the screen, provide, via the display, a selection menu including a quick message list as an overlay on the screen.

11. The electronic device of claim 1,
wherein the second vibration feedback provided via the second actuator is more localized to the touch input portion than the first vibration feedback provided via the first actuator to the body of the housing.

12. The electronic device of claim 1,
wherein the second actuator is in contact with an inner surface of the touch input portion.

13. The electronic device of claim 1,
wherein the second actuator is controlled by the at least one processor independently from the first actuator.

14. An electronic device comprising:
a housing;
a button portion partially forming a side surface of the housing;
a speaker;
a first actuator configured to provide vibration feedback through a body of the housing to which the first actuator is coupled;
a second actuator configured to provide vibration feedback through the button portion to which the second actuator is coupled;
at least one processor including processing circuitry;
memory including one or more storage media storing instructions,
wherein the instructions, when executed by the at least one processor individually or collectively, cause the electronic device to:
detect an event;
in response to detecting the event:
provide a ringtone via the speaker based on a state of the electronic device set as a first state in which the speaker is activated and the first actuator is deactivated; and
provide first vibration feedback via the first actuator based on a state of the electronic device set as a second state in which the speaker is deactivated and the first actuator is activated;
while the first vibration feedback or the ringtone is provided, identify a user touch input to the button portion; and
based on identifying the user touch input,
transit a state of the electronic device from the first state or the second state to a third state for providing second vibration feedback via the second actuator to inform that the touch input is processed,
wherein the third state is:
a state in which the speaker is deactivated from the first state; and
a state in which the first actuator is deactivated from the second state.

15. The electronic device of claim 14,
wherein the instructions, when executed by the at least one processor individually or collectively, cause the electronic device to provide the second vibration feedback via the second actuator while the touch input is maintained on the button portion.

16. The electronic device of claim 14, wherein:
the user touch input comprises a first user touch input;
the button portion comprises a first button portion;
the event includes an incoming call;
the electronic device comprises:
a second button portion partially forming the side surface of the housing, and
a third actuator configured to provide vibration feedback through the second button portion to which the third actuator is coupled; and the instructions, when executed by the at least one processor individually or collectively, cause the electronic device to:

based on identifying a second user touch input to the second button portion while the first vibration feedback is provided, reject the incoming call; and based on identifying a third user touch input to the first button portion while the first vibration feedback is provided, accept the incoming call.

17. The electronic device of claim 16, comprising:

a first sensor configured to detect a pressure of touch input on the first button portion; and a second sensor configured to detect a pressure of touch input on the second button portion, and wherein:

the second touch input includes a touch input on the second button portion exceeding a first threshold pressure value;

the third touch input includes a touch input on the first button portion exceeding a second threshold pressure value; and the instructions, when executed by the at least one processor individually or collectively, cause the electronic device to:

based on identifying the second touch input, provide third vibration feedback via the third actuator to inform that the incoming call is rejected; and based on identifying the third touch input, provide fourth vibration feedback via the second actuator to inform that the incoming call is accepted.

* * * * *